US011385097B1

(12) United States Patent
Allstot et al.

(10) Patent No.: US 11,385,097 B1
(45) Date of Patent: Jul. 12, 2022

(54) OPTICAL VIBRATION MEASUREMENT SYSTEMS FOR AERIAL VEHICLES

(71) Applicant: Amazon Technologies, Inc., Seattle, WA (US)

(72) Inventors: Noah Allstot, Seattle, WA (US); Dominic Scott Lebaron, Issaquah, WA (US); Bradley Leonard, Yucaipa, CA (US); Ryan Jeffrey Aalund, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 696 days.

(21) Appl. No.: 15/995,001

(22) Filed: May 31, 2018

(51) Int. Cl.
*G01P 15/093* (2006.01)
*G01H 9/00* (2006.01)
*B64C 27/00* (2006.01)
*B64C 39/02* (2006.01)

(52) U.S. Cl.
CPC .......... *G01H 9/004* (2013.01); *B64C 27/001* (2013.01); *B64C 39/024* (2013.01); *B64C 2201/14* (2013.01)

(58) Field of Classification Search
CPC .......... G01H 9/004; G01H 5/00; G01H 9/006; B64C 27/001; B64C 39/024; B64C 2201/14; G01P 15/093; G01J 3/26; G01J 9/02
See application file for complete search history.

(56) References Cited

U.S. PATENT DOCUMENTS

| 4,408,495 | A | * | 10/1983 | Couch | G01H 9/004 250/227.16 |
| 4,599,711 | A | * | 7/1986 | Cuomo | H04R 23/008 250/227.24 |
| 4,724,316 | A | * | 2/1988 | Morton | G01D 5/35345 385/128 |
| 4,918,303 | A | * | 4/1990 | Gergely | G01H 9/004 250/231.19 |
| 5,061,846 | A | * | 10/1991 | Gergely | G01H 9/004 250/231.19 |
| 5,222,165 | A | * | 6/1993 | Bohlinger | G02B 6/264 250/231.19 |
| 5,359,445 | A | * | 10/1994 | Robertson | G01D 5/268 73/702 |
| 5,446,278 | A | * | 8/1995 | Weiss | G01P 15/093 250/227.15 |

(Continued)

*Primary Examiner* — Balram T Parbadia
(74) *Attorney, Agent, or Firm* — Athorus, PLLC

(57) ABSTRACT

Systems and methods related to optical measurement of vibrations experienced by components may include a light source, a reflector associated with a component to be measured, and an optical sensor. In addition, the systems may include one or more fiber optic cables to transmit emitted light between the light source and the reflector, and to transmit reflected light between the reflector and the optical sensor. The optical measurement systems may enable detection of a large dynamic range of vibrations experienced by components or systems, and may also enable determinations related to high cycle fatigue and other stresses. Further, the optical measurement systems may be integrated into systems having various components to be measured, thereby enabling continuous, in-situ measurement of vibrations and health, as well as continuous monitoring and adjustment of operations of such systems.

19 Claims, 11 Drawing Sheets

(56) References Cited

U.S. PATENT DOCUMENTS

| | | | | |
|---|---|---|---|---|
| 6,008,898 A | * | 12/1999 | Furstenau | G01P 15/093 |
| | | | | 356/519 |
| 7,110,626 B2 | * | 9/2006 | Tsai | G01H 9/004 |
| | | | | 385/12 |
| 2010/0012819 A1 | * | 1/2010 | Graham | H02J 5/00 |
| | | | | 250/237 R |
| 2012/0033220 A1 | * | 2/2012 | Kotidis | G02B 21/008 |
| | | | | 356/445 |
| 2012/0257208 A1 | * | 10/2012 | Andersen | G01B 9/02014 |
| | | | | 73/488 |
| 2015/0041598 A1 | * | 2/2015 | Nugent | H04B 10/807 |
| | | | | 244/53 R |
| 2017/0285627 A1 | * | 10/2017 | Feldmann | H04W 4/025 |
| 2018/0145751 A1 | * | 5/2018 | Barad | G02B 6/4246 |
| 2018/0252575 A1 | * | 9/2018 | Wang | G01H 9/004 |

* cited by examiner

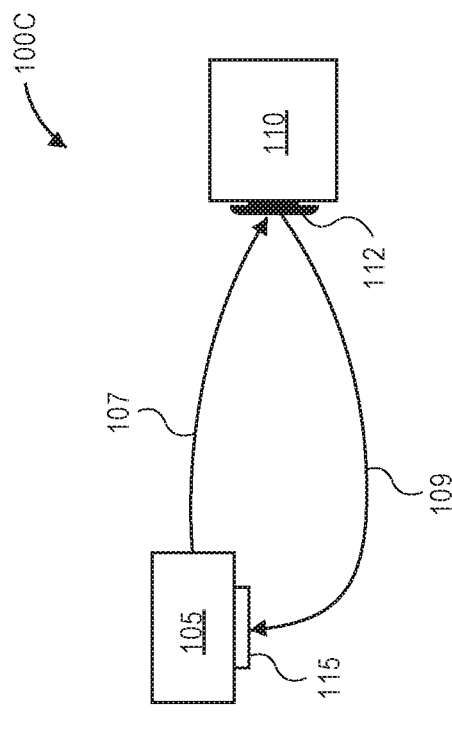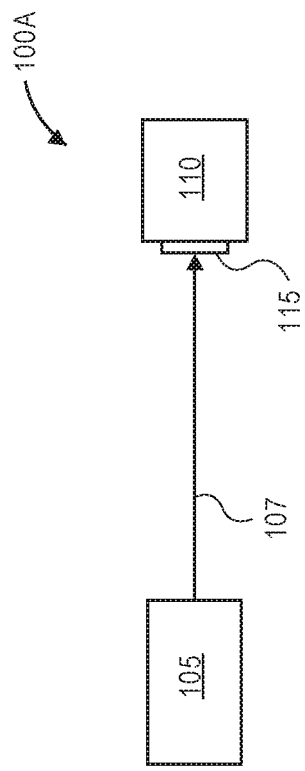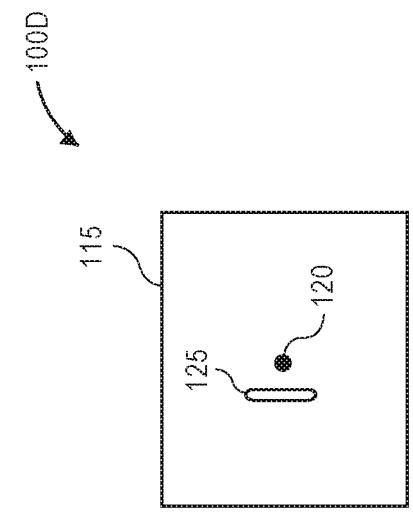

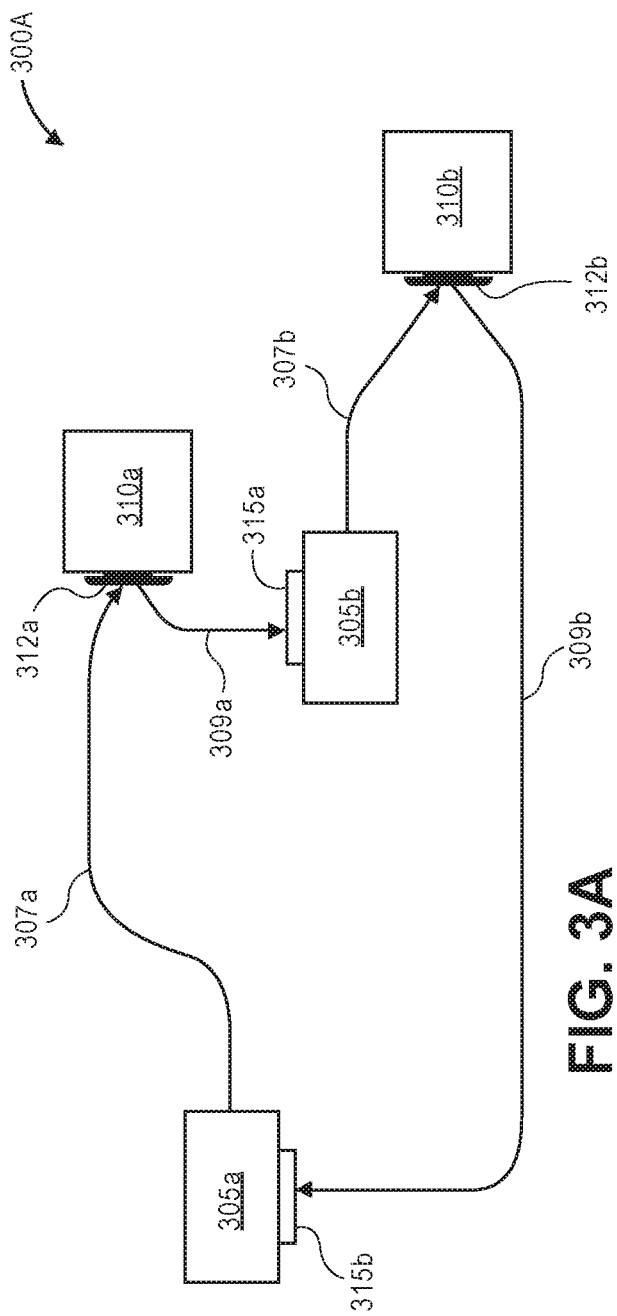
FIG. 3A
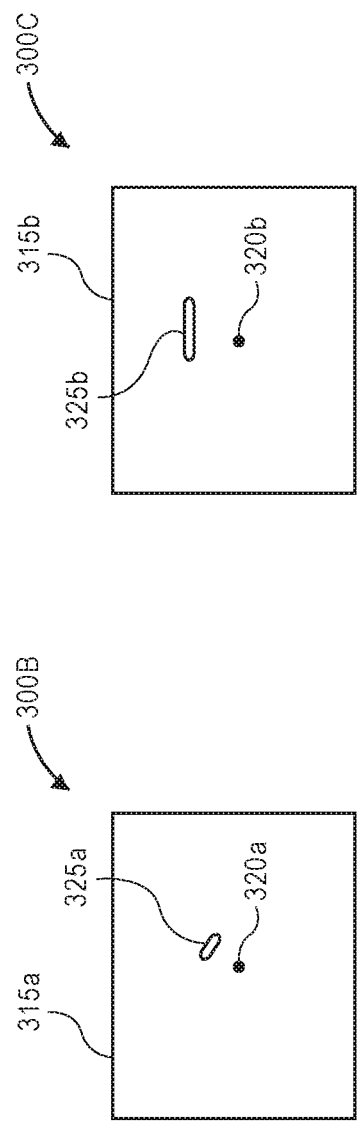
FIG. 3B
FIG. 3C

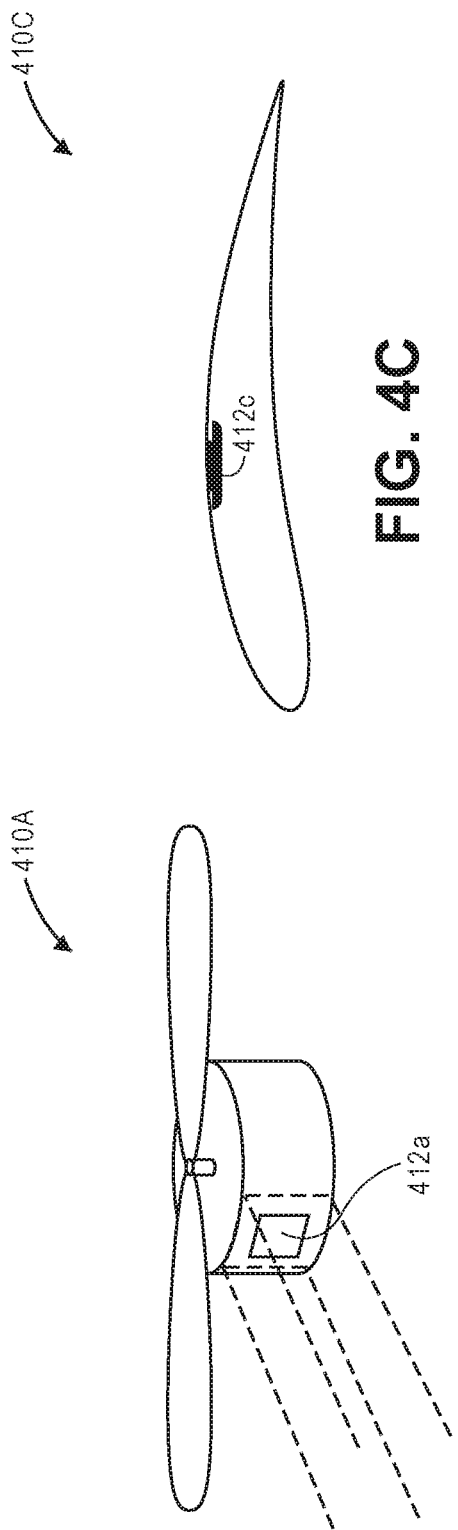
FIG. 4B
FIG. 4C
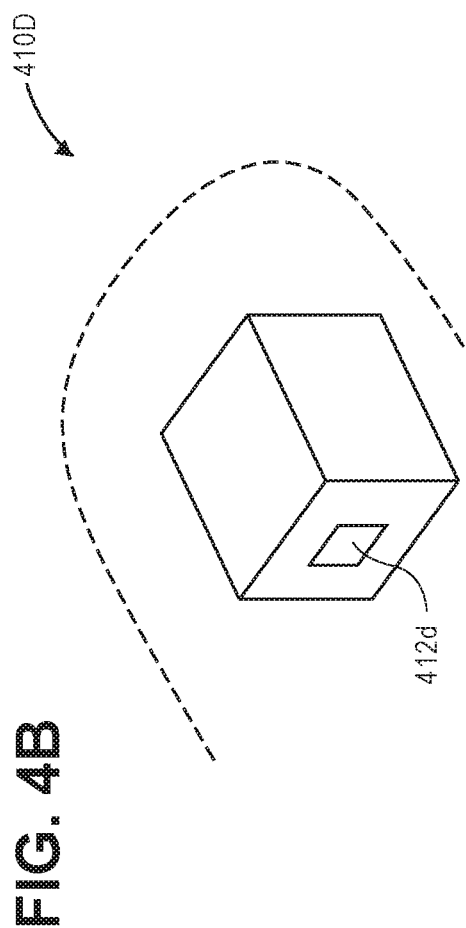
FIG. 4D

OPTICAL VIBRATION MEASUREMENT SYSTEMS FOR AERIAL VEHICLES

BACKGROUND

Various electromechanical systems such as vehicles, e.g., aerial vehicles, may experience vibrations during operation. Conventional methods to measure such vibrations may include inertial measurement units or accelerometers. However, such conventional methods lack dynamic range capabilities and cannot accurately measure higher levels of vibrations, e.g., above 16 g vibrations, or lower levels of vibrations, e.g., on the order of milli-g or micro-g vibrations. Accordingly, there is a need for systems and methods to accurately measure a greater dynamic range of vibrations experienced by components of various electromechanical systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1A is a schematic diagram of an example optical vibration measurement system, according to an implementation.

FIG. 1B is a schematic diagram of an example photodetector of the example optical vibration measurement system of FIG. 1A, according to an implementation.

FIG. 1C is a schematic diagram of another example optical vibration measurement system, according to an implementation.

FIG. 1D is a schematic diagram of an example photodetector of the example optical vibration measurement system of FIG. 1C, according to an implementation.

FIG. 3A is a schematic diagram of a further example optical vibration measurement system, according to an implementation.

FIG. 3B is a schematic diagram of an example photodetector of the example optical vibration measurement system of FIG. 3A, according to an implementation.

FIG. 3C is a schematic diagram of another example photodetector of the example optical vibration measurement system of FIG. 3A, according to an implementation.

FIG. 4B is a schematic diagram of an example motor of the example aerial vehicle of FIG. 4A, according to an implementation.

FIG. 4C is a schematic diagram of an example wing of the example aerial vehicle of FIG. 4A, according to an implementation.

FIG. 4D is a schematic diagram of an example fuselage of the example aerial vehicle of FIG. 4A, according to an implementation.

Figure 2A:
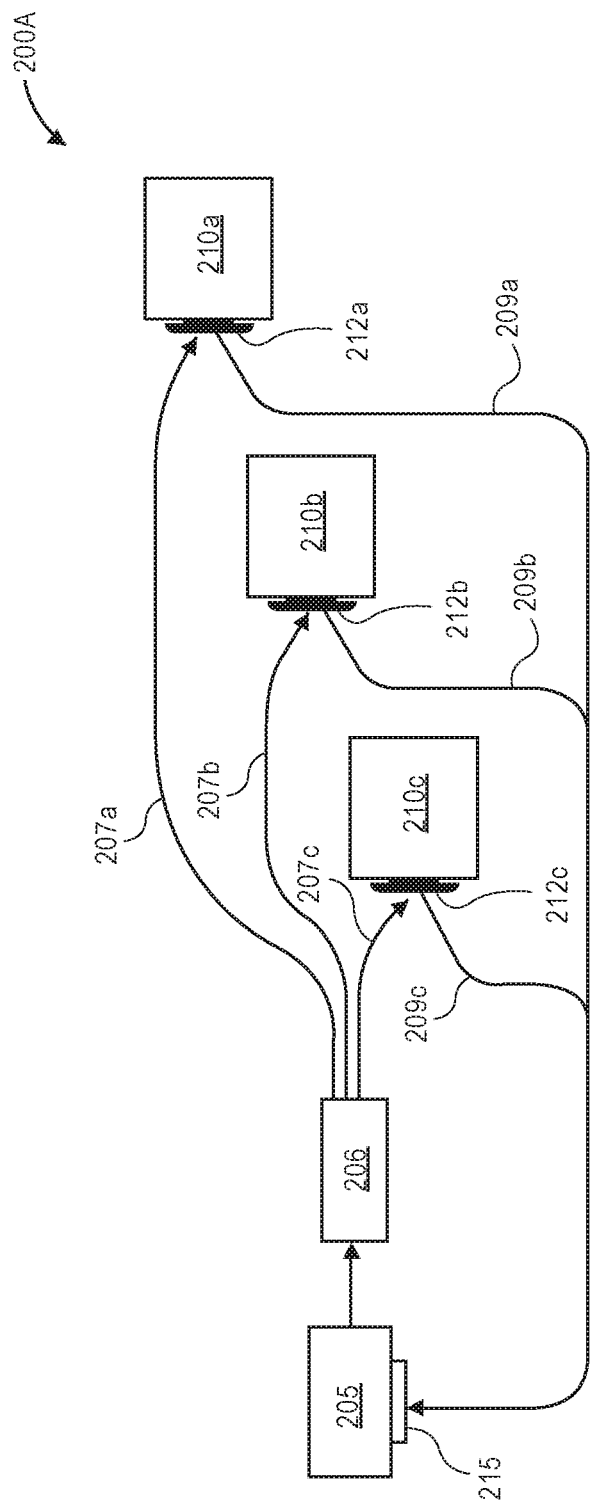
FIG. 2A is a schematic diagram of yet another example optical vibration measurement system, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein relate to optical vibration measurement systems that can measure vibrations of a component using light. In addition, systems and methods described herein relate to optical vibration measurement systems that can measure vibrations of multiple components using different pulses or wavelengths of light. Further, systems and methods described herein relate to optical vibration measurement systems that can measure coupled vibrations of components using multiple light sources and sensors in a chained configuration. Vibrations of components of any types of systems, machines, or devices may be measured, including vibrations of components included in vehicles, such as ground vehicles, aerial vehicle, or other types of vehicles.

In example embodiments, an optical vibration measurement system may include a light source and an optical sensor associated with a component to be measured. For example, the light source may have a direct line of sight with the optical sensor associated with the component and emit light toward the optical sensor. The optical sensor may detect aspects of the light received from the light source, and the detected aspects of the light may be compared with expected or nominal aspects of the light to determine one or more differences. Based at least in part on the differences, vibration of the component may be determined.

In other example embodiments, an optical vibration measurement system may include a light source, an optical sensor positioned proximate to and/or coupled to the light source, and a reflector associated with a component to be measured. In addition, the optical vibration measurement system may include one or more fiber optic cables. For example, the light source may emit light via a first fiber optic cable toward the reflector associated with the component, the light may be reflected via the reflector, and the reflected light may be transmitted via a second fiber optic cable toward the optical sensor. The optical sensor may detect aspects of the reflected light received from the light source via the reflector, and the detected aspects of the reflected light may be compared with expected or nominal aspects of the light to determine one or more differences. Based at least in part on the differences, vibration of the component may be determined.

In further example embodiments, an optical vibration measurement system may also include a splitter configured to direct or split various pulses and/or wavelengths of light to respective components of a plurality of components to be measured. Particular pulses and/or particular wavelengths of light may be directed to particular components such that reflections of light received from each component may be distinguished from reflections of light received from other components. For example, the light source may emit continuous or pulsed light that is split or directed to respective components via the splitter. Various pulses and/or wavelengths of light may be transmitted via respective first fiber optic cables toward reflectors associated with the respective components, the various pulses and/or wavelengths of light may be reflected via respective reflectors, and the reflected pulses and/or wavelengths of light may be transmitted via respective second fiber optic cables toward the optical sensor. The optical sensor may detect aspects of the reflected pulses and/or wavelengths of light received from the light source via the reflectors, and the detected aspects of the reflected pulses and/or wavelengths of light may be compared with expected or nominal aspects of the pulses and/or wavelengths of light to determine one or more differences. Based at least in part on the differences, vibrations of the components may be determined.

In still further example embodiments, an optical vibration measurement system may include a plurality of light sources, a plurality of optical sensors positioned proximate to and/or coupled to respective light sources, and a plurality of reflectors associated with respective components of a plurality of components to be measured. The respective pluralities of light sources, reflectors, and optical sensors may be chained around a system including the plurality of components to determine both individual and coupled vibrations for the plurality of components. For example, a first light source may emit first light via a first fiber optic cable toward a first reflector associated with a first component, the first light may be reflected via the first reflector, and the reflected first light may be transmitted via a second fiber optic cable toward a first optical sensor. In addition, a second light source may emit second light via a third fiber optic cable toward a second reflector associated with a second component, the second light may be reflected via the second reflector, and the reflected second light may be transmitted via a fourth fiber optic cable toward a second optical sensor. Further, the first optical sensor may be positioned proximate to and/or coupled to the second light source, and the second optical sensor may be positioned proximate to and/or coupled to the first light source. The respective optical sensors may detect aspects of the reflected light received from respective light sources via respective reflectors, and the detected aspects of the reflected light may be compared with expected or nominal aspects of the light to determine one or more differences. Based at least in part on the differences, vibrations of the components, including both individual and coupled vibrations, may be determined.

Using any of the optical vibration measurement systems described herein, vibrations of one or more components of various types of systems may be measured. For example, vibrations of components of various mechanical, electrical, or electromechanical systems, machines, devices, or other systems may be measured. In example embodiments, vibrations of components of vehicles, such as ground vehicles, aerial vehicles, or other types of vehicles, may be measured. For example, various components of aerial vehicles for which vibrations may be measured may include structural components, electromechanical components, avionics components, sensors, or other components.

FIG. 1A is a schematic diagram of an example optical vibration measurement system 100A, according to an implementation.

The example optical vibration measurement system 100A may include a light source 105 that emits light 107, a component 110 to be measured, and an optical sensor 115 associated with the component 110.

The light source 105 may comprise various types of light sources configured to emit light 107 toward the component 110. For example, the light source 105 may be a laser light source that emits laser light of various types. In addition, the light source 105 may emit light 107 at various wavelengths, including infrared light, visible light, ultraviolet light, and/or other wavelengths of light. Further, the light source 105 may emit light 107 that is continuous or pulsed at various frequencies. Moreover, the light source 105 may emit light 107 having various combinations of pulses and/or wavelengths of light, e.g., a first pulse of light at a first wavelength, a second pulse of light at a second wavelength, and so on.

In other example embodiments, the light 107 may be transmitted from the light source 105 to the optical sensor 115 via one or more fiber optic cables. For example, the fiber optic cables may include one or more optical fibers, e.g., a single fiber optic cable may include tens or hundreds of optical fibers. The fiber optic cables may allow light 107 to be transmitted from the light source 105 to the optical sensor 115 even if there is no direct line of sight between the light source 105 and the optical sensor 115.

Generally, infrared light may include electromagnetic radiation having wavelengths between approximately 750 nanometers (nm) and approximately 1 millimeter. In addition, visible light may include electromagnetic radiation having wavelengths between approximately 380 nm and approximately 750 nm. Further, visible light may generally be divided into wavelengths associated with visible colors, e.g., red light having wavelengths between approximately 620 nm and approximately 750 nm, orange light having wavelengths between approximately 590 nm and approximately 620 nm, yellow light having wavelengths between approximately 570 nm and approximately 590 nm, green light having wavelengths between approximately 495 nm and approximately 570 nm, blue light having wavelengths between approximately 450 nm and approximately 495 nm, and violet light having wavelengths between approximately 380 nm and approximately 450 nm. Furthermore, ultraviolet light may include electromagnetic radiation having wavelengths between approximately 100 nm and approximately 380 nm.

The component 110 may comprise any component to be measured that may be part of a system, such as a machine, device, or vehicle. The optical sensor 115 associated with the component 110 may be attached or coupled to, positioned proximate to, or formed integrally with the component 110. For example, the optical sensor 115 may be adhered or attached to the component 110 via adhesives, fasteners, or other coupling or attachment means. In addition, the optical sensor 115 may be formed or integrated into a portion of the component 110, e.g., formed or integrated into a surface, wall, or other portion of the component 110.

The optical sensor 115 may comprise various types of optical or imaging sensors configured to detect light received via various portions or sections of the optical sensor 115. For example, the optical sensor 115 may comprise a photodetector, a photosensor, a photovoltaic sensor, a complementary metal oxide semiconductor (CMOS) sensor, or other optical or imaging sensor. As shown in FIG. 1A, the light source 105 may emit light 107 toward the optical sensor 115 associated with the component 110 to measure vibrations of the component 110.

FIG. 1B is a schematic diagram of an example photodetector 100B of the example optical vibration measurement system 100A of FIG. 1A, according to an implementation.

The example photodetector 100B may comprise a surface of the optical sensor 115 that faces the light source 105, as viewed from a perspective of the light source 105 that emits light 107 toward the optical sensor 115. The light source 105 and optical sensor 115 may be calibrated such that the light source 105 emits light 107 having nominal or calibrated aspects that is received at a nominal or calibrated position 120 of the surface of the optical sensor 115. For example, the nominal position 120 may be detected by the optical sensor 115 and determined using a calibration process, e.g., by emitting light 107 from the light source 105 toward the optical sensor 115 associated with the component 110 when the component 110 or a system comprising the component 110 is in a non-operation phase or other calibration phase. In addition, the nominal or calibrated aspects of the emitted light 107 may comprise a phase, a wavelength, a frequency, or other aspects.

As shown in FIG. 1B, during an operation phase or other measurement phase of the component or a system comprising the component, the light source 105 may emit light 107 having nominal or calibrated aspects toward the surface of the optical sensor 115, and the optical sensor 115 may detect an operating position 125 of the received light 107 on a surface of the optical sensor 115. The operating position 125 may comprise changes in position in one or more directions relative to the nominal position 120. For example, as shown in FIG. 1B, the operating position 125 may be shifted vertically and may include a substantially horizontal oscillation indicative of vibrations. Further, differences in other aspects of the received light 107 such as changes to a phase, a wavelength, a frequency, and/or other aspects may also be determined. Although FIG. 1B illustrates particular changes to the received light 107 at the operating position 125 as compared to the nominal position 120, other combinations of changes to various aspects of received light may also be detected by the optical sensor.

FIG. 1C is a schematic diagram of another example optical vibration measurement system 100C, according to an implementation.

The example optical vibration measurement system 100C may include a light source 105 that emits light 107, a component 110 to be measured, a reflector 112 associated with the component 110, and an optical sensor 115 associated with the light source 105.

The light source 105 may comprise various types of light sources configured to emit light 107 toward the component 110. For example, the light source 105 may be a laser light source that emits laser light of various types. In addition, the light source 105 may emit light 107 at various wavelengths, including infrared light, visible light, ultraviolet light, and/or other wavelengths of light. Further, the light source 105 may emit light 107 that is continuous or pulsed at various frequencies. Moreover, the light source 105 may emit light 107 having various combinations of pulses and/or wavelengths of light, e.g., a first pulse of light at a first wavelength, a second pulse of light at a second wavelength, and so on.

The component 110 may comprise any component to be measured that may be part of a system, such as a machine, device, or vehicle. The reflector 112 associated with the component 110 may be attached or coupled to, positioned proximate to, or formed integrally with the component 110. For example, the reflector 112 may be adhered or attached to the component 110 via adhesives, fasteners, or other coupling or attachment means. In addition, the reflector 112 may be formed or integrated into a portion of the component 110, e.g., formed or integrated into a surface, wall, or other portion of the component 110.

The reflector 112 may comprise various types of optical reflectors configured to reflect light received from the light source 105. For example, the reflector 112 may comprise a mirror, a reflective surface, a metallic surface, or any other reflective element. As shown in FIG. 1C, the light source 105 may emit light 107 toward the reflector 112 associated with the component 110, and the reflector 112 may reflect light 109 back toward the optical sensor 115 to measure vibrations of the component 110. In example embodiments, the reflector 112 may be configured to reflect substantially all the emitted light 107 as reflected light 109 back toward the optical sensor 115, as opposed to merely backscattering only a portion of the emitted light 107 as reflected light 109.

The optical sensor 115 associated with the light source 105 may be attached or coupled to, positioned proximate to, or formed integrally with the light source 105. For example, the optical sensor 115 may be adhered or attached to the light source 105 via adhesives, fasteners, or other coupling or attachment means. In addition, the optical sensor 115 may be formed or integrated into a portion of the light source 105, e.g., formed or integrated into a surface, wall, or other portion of the light source 105.

The optical sensor 115 may comprise various types of optical or imaging sensors configured to detect light received via various portions or sections of the optical sensor 115. For example, the optical sensor 115 may comprise a photodetector, a photosensor, a photovoltaic sensor, a complementary metal oxide semiconductor (CMOS) sensor, or other optical or imaging sensor. As shown in FIG. 1C, the optical sensor 115 may receive light 109 reflected by the reflector 112 associated with the component 110 to measure vibrations of the component 110.

In other example embodiments, the emitted light 107 may be transmitted from the light source 105 to the reflector 112 via one or more fiber optic cables, and/or the reflected light 109 may be transmitted from the reflector 112 to the optical sensor 115 via one or more fiber optic cables. For example, the fiber optic cables may include one or more optical fibers, e.g., a single fiber optic cable may include tens or hundreds of optical fibers. The fiber optic cables may allow emitted light 107 to be transmitted from the light source 105 to the reflector 112 even if there is no direct line of sight between the light source 105 and the reflector 112, and/or the fiber optic cables may allow reflected light 109 to be transmitted from the reflector 112 to the optical sensor 115 even if there is no direct line of sight between the reflector 112 and the optical sensor 115.

FIG. 1D is a schematic diagram of an example photodetector 100D of the example optical vibration measurement system 100C of FIG. 1C, according to an implementation.

The example photodetector 100D may comprise a surface of the optical sensor 115 that receives light 109 reflected by the reflector 112, as viewed from a perspective of the reflected light 109 that is being transmitted toward the optical sensor 115. The light source 105, reflector 112, and optical sensor 115 may be calibrated such that the light source 105 emits light 107 having nominal or calibrated aspects toward the reflector 112, and the reflector 112 reflects light 109 that is received at a nominal or calibrated position 120 of the surface of the optical sensor 115. For example, the nominal position 120 may be detected by the optical sensor 115 and determined using a calibration process, e.g., by emitting light 107 from the light source 105 toward the reflector 112 associated with the component 110 when the component 110 or a system comprising the component 110 is in a non-operation phase or other calibration phase, and by reflecting light 109 by the reflector 112 toward the optical sensor 115. In addition, the nominal or calibrated aspects of the emitted light 107 may comprise a phase, a wavelength, a frequency, or other aspects.

As shown in FIG. 1D, during an operation phase or other measurement phase of the component or a system comprising the component, the light source 105 may emit light 107 having nominal or calibrated aspects toward the reflector 112, the reflector 112 may reflect light 109 having one or more changed aspects toward the surface of the optical sensor 115, and the optical sensor 115 may detect an operating position 125 of the received light 109 on a surface of the optical sensor 115. The operating position 125 may comprise changes in position in one or more directions relative to the nominal position 120. For example, as shown in FIG. 1D, the operating position 125 may be shifted horizontally and may include a substantially vertical oscillation indicative of vibrations. Further, differences in other aspects of the received light 109 such as changes to a phase, a wavelength, a frequency, and/or other aspects may also be determined. Although FIG. 1D illustrates particular changes to the received light 109 at the operating position 125 as compared to the nominal position 120, other combinations of changes to various aspects of received light may also be detected by the optical sensor.

FIG. 2A is a schematic diagram of yet another example optical vibration measurement system 200A, according to an implementation.

The example optical vibration measurement system 200A may include a light source 205 that emits light 207, a splitter 206, one or more components 210 to be measured, reflectors 212 associated with the components 210, and an optical sensor 215 associated with the light source 205.

The light source 205 may comprise various types of light sources configured to emit light 207 toward the components 210. For example, the light source 205 may be a laser light source that emits laser light of various types. In addition, the light source 205 may emit light 207 at various wavelengths, including infrared light, visible light, ultraviolet light, and/or other wavelengths of light. Further, the light source 205 may emit light 207 that is continuous or pulsed at various frequencies. Moreover, the light source 205 may emit light 207 having various combinations of pulses and/or wavelengths of light, e.g., a first pulse of light at a first wavelength, a second pulse of light at a second wavelength, and so on.

The splitter 206 may comprise various types of light or beam directing or splitting devices that may direct one or more portions of light 207 to one or more reflectors 212 associated with components 210. For example, the splitter 206 may comprise one or more prisms, mirrors, reflective surfaces, surfaces with various coatings, or other light directing or splitting elements. Moreover, the splitter 206 may be actuatable and/or controllable to selectively direct or split one or more portions of light 207 to one or more reflectors 212.

As shown in FIG. 2A, the splitter 206 may direct a first portion of light 207a to a first reflector 212a associated with a first component 210a, a second portion of light 207b to a second reflector 212b associated with a second component 210b, and a third portion of light 207c to a third reflector 212c associated with a third component 210c. Each of the first, second, and third portions of light 207 may comprise different pulses of light from the light source 205, e.g., pulses of light emitted by the light source 205 at different times, and/or each of the first, second, and third portions of light 207 may comprise different wavelengths of light from the light source 205, e.g., infrared light at a particular wavelength, visible light at a particular wavelength, or other wavelengths of light.

The components 210 may comprise any components to be measured that may be part of one or more systems, such as machines, devices, or vehicles. The reflectors 212 associated with the components 210 may be attached or coupled to, positioned proximate to, or formed integrally with the components 210. For example, the reflectors 212 may be adhered or attached to the components 210 via adhesives, fasteners, or other coupling or attachment means. In addition, the reflectors 212 may be formed or integrated into a portion of the components 210, e.g., formed or integrated into a surface, wall, or other portion of the components 210.

The reflectors 212 may comprise various types of optical reflectors configured to reflect light received from the light source 205 and/or splitter 206. For example, the reflectors 212 may comprise a mirror, a reflective surface, a metallic surface, or any other reflective element. As shown in FIG. 2A, the light source 205 and/or splitter 206 may emit light 207 toward the reflectors 212 associated with the components 210, and the reflectors 212 may reflect light 209 back toward the optical sensor 215 to measure vibrations of the components 210. In example embodiments, the reflectors 212 may be configured to reflect substantially all the emitted light 207 as reflected light 209 back toward the optical sensor 215, as opposed to merely backscattering only a portion of the emitted light 207 as reflected light 209.

Although FIG. 2A illustrates three different portions of emitted light 207a, 207b, 207c, three different reflectors 212a, 212b, 212c associated with three different components 210a, 210b, 210c, and three different portions of reflected light 209a, 209b, 209c, any other number or combination of portions of emitted light, reflectors associated with components, and/or portions of reflected light may be included in the example optical vibration measurement systems described herein. For example, a different number of portions of emitted light, reflectors associated with components, and/or portions of reflected light may be included. In addition, a single component may include multiple reflectors at different locations, and respective portions of emitted light and reflected light may be associated with each of the multiple reflectors of the single component. In other example embodiments, the example optical vibration measurement systems described herein may include multiple splitters, and/or may include one or more splitters attached to, integrated with, or formed as a part of one or more light sources.

The optical sensor 215 associated with the light source 205 may be attached or coupled to, positioned proximate to, or formed integrally with the light source 205. For example, the optical sensor 215 may be adhered or attached to the light source 205 via adhesives, fasteners, or other coupling or attachment means. In addition, the optical sensor 215 may be formed or integrated into a portion of the light source 205, e.g., formed or integrated into a surface, wall, or other portion of the light source 205.

The optical sensor 215 may comprise various types of optical or imaging sensors configured to detect light received via various portions or sections of the optical sensor 215. For example, the optical sensor 215 may comprise a photodetector, a photosensor, a photovoltaic sensor, a complementary metal oxide semiconductor (CMOS) sensor, or other optical or imaging sensor. As shown in FIG. 2A, the optical sensor 215 may receive light 209 reflected by the reflectors 212 associated with the components 210 to measure vibrations of the components 210.

In other example embodiments, the emitted light 207 may be transmitted from the light source 205 and/or splitter 206 to the reflectors 212 via one or more fiber optic cables, and/or the reflected light 209 may be transmitted from the reflectors 212 to the optical sensor 215 via one or more fiber optic cables. For example, the fiber optic cables may include one or more optical fibers, e.g., a single fiber optic cable may include tens or hundreds of optical fibers. The fiber optic cables may allow emitted light 207 to be transmitted from the light source 205 to the reflectors 212 even if there is no direct line of sight between the light source 205 and the reflectors 212, and/or the fiber optic cables may allow reflected light 209 to be transmitted from the reflectors 212 to the optical sensor 215 even if there is no direct line of sight between the reflectors 212 and the optical sensor 215.

By transmitting different respective pulses and/or wavelengths of light to each of a plurality of reflectors 212 associated with respective components 210, the different respective pulses and/or wavelengths of reflected light received by the optical sensor 215 from each of the plurality of reflectors 212 may be differentiated or distinguished from each other. For example, a first wavelength of light that is transmitted to a first reflector 212a and reflected back to the optical sensor 215 may be distinguished from a second wavelength of light that is transmitted to a second reflector 212b and reflected back to the optical sensor 215, even if both the first and second wavelengths of light are received during at least partially overlapping times. In addition, a first pulse of light that is transmitted at a first time to a first reflector 212a and reflected back to the optical sensor 215 may be distinguished from a second pulse of light that is transmitted at a second time to a second reflector 212b and reflected back to the optical sensor 215 based at least in part on the different times at which the optical sensor 215 detects the reflected pulses of light. Likewise, other combinations of different respective pulses and/or wavelengths of light may be received by a single optical sensor and distinguished or differentiated from each other based at least in part on characteristics associated with the respective pulses and/or wavelengths of light.

Figure 2B:
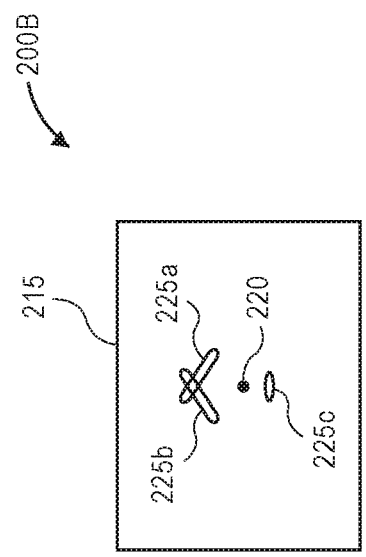
FIG. 2B is a schematic diagram of an example photodetector of the example optical vibration measurement system of FIG. 2A, according to an implementation.

FIG. 2B is a schematic diagram of an example photodetector 200B of the example optical vibration measurement system 200A of FIG. 2A, according to an implementation.

The example photodetector 200B may comprise a surface of the optical sensor 215 that receives portions of light 209 reflected by the reflectors 212, as viewed from a perspective of the portions of reflected light 209 that are being transmitted toward the optical sensor 215. The light source 205, reflectors 212, and optical sensor 215 may be calibrated such that the light source 205 emits portions of light 207 having nominal or calibrated aspects toward the reflectors 212, and the reflectors 212 reflect portions of light 209 that are received at one or more nominal or calibrated positions 220 of the surface of the optical sensor 215. For example, the nominal positions 220 may be detected by the optical sensor 215 and determined using a calibration process, e.g., by emitting portions of light 207 from the light source 205 toward the reflectors 212 associated with the components 210 when the components 210 or one or more systems comprising the components 210 are in a non-operation phase or other calibration phase, and by reflecting portions of light 209 by the reflectors 212 toward the optical sensor 215. In addition, the nominal or calibrated aspects of the emitted light 207 may comprise a phase, a wavelength, a frequency, or other aspects.

As shown in FIG. 2B, during an operation phase or other measurement phase of the components or one or more systems comprising the components, the light source 205 may emit portions of light 207 having nominal or calibrated aspects toward the reflectors 212, the reflectors 212 may reflect portions of light 209 having one or more changed aspects toward the surface of the optical sensor 215, and the optical sensor 215 may detect one or more operating positions 225 of the received portions of light 209 on a surface of the optical sensor 215. The operating positions 225 may comprise changes in position in one or more directions relative to the nominal positions 220. For example, as shown in FIG. 2B, the operating positions 225a, 225b, 225c may be shifted in various manners horizontally and/or vertically and/or may include various types of oscillation indicative of vibrations. Further, differences in other aspects of the received portions of light 209 such as changes to a phase, a wavelength, a frequency, and/or other aspects may also be determined. Although FIG. 2B illustrates particular changes to the received portions of light 209 at the operating positions 225 as compared to the nominal positions 220, other combinations of changes to various aspects of received portions of light may also be detected by the optical sensor.

As described herein, by transmitting different respective pulses and/or wavelengths of light to each of a plurality of reflectors 212 associated with respective components 210, the different respective pulses and/or wavelengths of reflected light received by the optical sensor 215 from each of the plurality of reflectors 212 may be differentiated or distinguished from each other. For example, a first operating position 225a associated with a first wavelength of light that is transmitted to a first reflector 212a and reflected back to the optical sensor 215 may be distinguished from a second operating position 225b associated with a second wavelength of light that is transmitted to a second reflector 212b and reflected back to the optical sensor 215, even if both the first and second wavelengths of light are received during at least partially overlapping times. In addition, a first operating position 225a associated with a first pulse of light that is transmitted at a first time to a first reflector 212a and reflected back to the optical sensor 215 may be distinguished from a second operating position 225b associated with a second pulse of light that is transmitted at a second time to a second reflector 212b and reflected back to the optical sensor 215 based at least in part on the different times at which the optical sensor 215 detects the reflected pulses of light. Likewise, other combinations of different respective pulses and/or wavelengths of light may be received by a single optical sensor and distinguished or differentiated from each other based at least in part on characteristics associated with the respective pulses and/or wavelengths of light.

FIG. 3A is a schematic diagram of a further example optical vibration measurement system 300A, according to an implementation.

The example optical vibration measurement system 300A may include one or more light sources 305 that emit light 307, one or more components 310 to be measured, reflectors 312 associated with the components 310, and one or more optical sensors 315 associated with respective light sources 305.

As shown in FIG. 3A, the one or more light sources 305, reflectors 312 associated with components 310, and one or more optical sensors 315 may be configured as a sequence or in series, e.g., in a chained configuration. In this manner, a first light source 305a may emit first light 307a toward a first reflector 312a associated a first component 310a, and the first reflector 312a may reflect the first light 309a to a first optical sensor 315a. In addition, a second light source 305b may emit second light 307b toward a second reflector 312b associated a second component 310b, and the second reflector 312b may reflect the second light 309b to a second optical sensor 315b. Further, the first optical sensor 315a may be associated with the second light source 305b, and the second optical sensor 315b may be associated with the first light source 305a. By such a chained configuration, detected changes in aspects of the reflected light received by the one or more optical sensors 315 may be processed to determine vibrations associated with each of the components 310 individually, as well as to determine combined or coupled vibrations associated with various combinations of the components 310.

The light sources 305 may comprise various types of light sources configured to emit light 307 toward the components 310. For example, the light sources 305 may be laser light sources that emit laser light of various types. In addition, the light sources 305 may emit light 307 at various wavelengths, including infrared light, visible light, ultraviolet light, and/or other wavelengths of light. Further, the light sources 305 may emit light 307 that is continuous or pulsed at various frequencies. Moreover, the light sources 305 may emit light 307 having various combinations of pulses and/or wavelengths of light, e.g., a first pulse of light at a first wavelength, a second pulse of light at a second wavelength, and so on.

The components 310 may comprise any components to be measured that may be part of one or more systems, such as machines, devices, or vehicles. The reflectors 312 associated with the components 310 may be attached or coupled to, positioned proximate to, or formed integrally with the components 310. For example, the reflectors 312 may be adhered or attached to the components 310 via adhesives, fasteners, or other coupling or attachment means. In addition, the reflectors 312 may be formed or integrated into a portion of the components 310, e.g., formed or integrated into a surface, wall, or other portion of the components 310.

The reflectors 312 may comprise various types of optical reflectors configured to reflect light received from the light sources 305. For example, the reflectors 312 may comprise a mirror, a reflective surface, a metallic surface, or any other reflective element. As shown in FIG. 3A, the light sources 305 may emit light 307 toward the reflectors 312 associated with the components 310, and the reflectors 312 may reflect light 309 back toward the optical sensors 315 to measure vibrations of the components 310. In example embodiments, the reflectors 312 may be configured to reflect substantially all the emitted light 307 as reflected light 309 back toward the optical sensors 315, as opposed to merely backscattering only a portion of the emitted light 307 as reflected light 309.

Although FIG. 3A illustrates two light sources 305a, 305b, two reflectors 312a, 312b, and two optical sensors 315a, 315b, any other number or combination of light sources, reflectors, and/or optical sensors may be included in the example optical vibration measurement systems described herein. For example, a different number of light sources, reflectors, and/or optical sensors may be included. In addition, a single component may include multiple reflectors at different locations, and multiple light sources and multiple optical sensors may emit light toward and receive light from, respectively, each of the multiple reflectors of the single component. In other example embodiments, the example optical vibration measurement systems described herein may include one or more splitters, and/or may include one or more splitters attached to, integrated with, or formed as a part of one or more light sources.

The optical sensors 315 associated with the light sources 305 may be attached or coupled to, positioned proximate to, or formed integrally with the light sources 305. For example, the optical sensors 315 may be adhered or attached to the light sources 305 via adhesives, fasteners, or other coupling or attachment means. In addition, the optical sensors 315 may be formed or integrated into a portion of the light sources 305, e.g., formed or integrated into a surface, wall, or other portion of the light sources 305.

The optical sensors 315 may comprise various types of optical or imaging sensors configured to detect light received via various portions or sections of the optical sensors 315. For example, the optical sensors 315 may comprise a photodetector, a photosensor, a photovoltaic sensor, a complementary metal oxide semiconductor (CMOS) sensor, or other optical or imaging sensor. As shown in FIG. 3A, the optical sensors 315 may receive light 309 reflected by the reflectors 312 associated with the components 310 to measure vibrations of the components 310.

In other example embodiments, the emitted light 307 may be transmitted from the light sources 305 to the reflectors 312 via one or more fiber optic cables, and/or the reflected light 309 may be transmitted from the reflectors 312 to the optical sensors 315 via one or more fiber optic cables. For example, the fiber optic cables may include one or more optical fibers, e.g., a single fiber optic cable may include tens or hundreds of optical fibers. The fiber optic cables may allow emitted light 307 to be transmitted from the light sources 305 to the reflectors 312 even if there is no direct line of sight between the light sources 305 and the reflectors 312, and/or the fiber optic cables may allow reflected light 309 to be transmitted from the reflectors 312 to the optical sensors 315 even if there is no direct line of sight between the reflectors 312 and the optical sensors 315.

By configuring the one or more light sources 305, reflectors 312 associated with components 310, and one or more optical sensors 315 as a sequence or in series, e.g., in a chained configuration, detected changes in aspects of the reflected light received by the one or more optical sensors 315 may be processed to determine vibrations associated with each of the components 310 individually, as well as to determine combined or coupled vibrations associated with various combinations of the components 310.

FIG. 3B is a schematic diagram of an example photodetector 300B of the example optical vibration measurement system 300A of FIG. 3A, according to an implementation.

The example photodetector 300B may comprise a surface of the optical sensor 315a that receives light 309a reflected by the reflector 312a, as viewed from a perspective of the reflected light 309a that is being transmitted toward the optical sensor 315a. The light source 305a, reflector 312a, and optical sensor 315a may be calibrated such that the light source 305a emits light 307a having nominal or calibrated aspects toward the reflector 312a, and the reflector 312a reflects light 309a that is received at a nominal or calibrated position 320a of the surface of the optical sensor 315a. For example, the nominal position 320a may be detected by the optical sensor 315a and determined using a calibration process, e.g., by emitting light 307a from the light source 305a toward the reflector 312a associated with the component 310a when the component 310a or a system comprising the component 310a is in a non-operation phase or other calibration phase, and by reflecting light 309a by the reflector 312a toward the optical sensor 315a. In addition, the nominal or calibrated aspects of the emitted light 307a may comprise a phase, a wavelength, a frequency, or other aspects.

As shown in FIG. 3B, during an operation phase or other measurement phase of the component or a system comprising the component, the light source 305a may emit light 307a having nominal or calibrated aspects toward the reflector 312a, the reflector 312a may reflect light 309a having one or more changed aspects toward the surface of the optical sensor 315a, and the optical sensor 315a may detect an operating position 325a of the received light 309a on a surface of the optical sensor 315a. The operating position 325a may comprise changes in position in one or more directions relative to the nominal position 320a. For example, as shown in FIG. 3B, the operating position 325a may be shifted in various manners horizontally and/or vertically and/or may include various types of oscillation indicative of vibrations. Further, differences in other aspects of the received light 309a such as changes to a phase, a wavelength, a frequency, and/or other aspects may also be determined. Although FIG. 3B illustrates particular changes to the received light 309a at the operating position 325a as compared to the nominal position 320a, other combinations of changes to various aspects of received light may also be detected by the optical sensor.

FIG. 3C is a schematic diagram of another example photodetector 300C of the example optical vibration measurement system 300A of FIG. 3A, according to an implementation.

The example photodetector 300C may comprise a surface of the optical sensor 315b that receives light 309b reflected by the reflector 312b, as viewed from a perspective of the reflected light 309b that is being transmitted toward the optical sensor 315b. The light source 305b, reflector 312b, and optical sensor 315b may be calibrated such that the light source 305b emits light 307b having nominal or calibrated aspects toward the reflector 312b, and the reflector 312b reflects light 309b that is received at a nominal or calibrated position 320b of the surface of the optical sensor 315b. For example, the nominal position 320b may be detected by the optical sensor 315b and determined using a calibration process, e.g., by emitting light 307b from the light source 305b toward the reflector 312b associated with the component 310b when the component 310b or a system comprising the component 310b is in a non-operation phase or other calibration phase, and by reflecting light 309b by the reflector 312b toward the optical sensor 315b. In addition, the nominal or calibrated aspects of the emitted light 307b may comprise a phase, a wavelength, a frequency, or other aspects.

As shown in FIG. 3C, during an operation phase or other measurement phase of the component or a system comprising the component, the light source 305b may emit light 307b having nominal or calibrated aspects toward the reflector 312b, the reflector 312b may reflect light 309b having one or more changed aspects toward the surface of the optical sensor 315b, and the optical sensor 315b may detect an operating position 325b of the received light 309b on a surface of the optical sensor 315b. The operating position 325b may comprise changes in position in one or more directions relative to the nominal position 320b. For example, as shown in FIG. 3C, the operating position 325b may be shifted in various manners horizontally and/or vertically and/or may include various types of oscillation indicative of vibrations. Further, differences in other aspects of the received light 309b such as changes to a phase, a wavelength, a frequency, and/or other aspects may also be determined. Although FIG. 3C illustrates particular changes to the received light 309b at the operating position 325b as compared to the nominal position 320b, other combinations of changes to various aspects of received light may also be detected by the optical sensor.

By configuring the one or more light sources 305, reflectors 312 associated with components 310, and one or more optical sensors 315 as a sequence or in series, e.g., in a chained configuration, detected changes in aspects of the reflected light received by the one or more optical sensors 315 may be processed to determine vibrations associated with each of the components 310 individually, as well as to determine combined or coupled vibrations associated with various combinations of the components 310. For example, the detected changes in aspects of the reflected first light 309a received by the first optical sensor 315a may be processed to determine vibrations associated with the first component 310a individually, e.g., by eliminating or normalizing for any noise or other vibrations experienced by each of the first light source 305a and the first optical sensor 315a. Likewise, the detected changes in aspects of the reflected second light 309b received by the second optical sensor 315b may be processed to determine vibrations associated with the second component 310b individually, e.g., by eliminating or normalizing for any noise or other vibrations experienced by each of the second light source 305b and the second optical sensor 315b.

Further, if the first optical sensor 315a and second light source 305b are positioned proximate to the first component 310a as part of the chained configuration, then the detected changes in aspects of the reflected second light 309b received by the second optical sensor 315b may also be processed to determine vibrations associated with the components 310a, 310b in combination, e.g., by eliminating or normalizing for any noise or other vibrations experienced by each of the first light source 305a and the second optical sensor 315b. Various other vibrations associated with combinations of components may be determined based at least in part on the chained configuration of light sources, reflectors associated with components, and optical sensors.

Although various individual example embodiments are described with reference to FIGS. 1A to 3C, various components, elements, and/or aspects of the different example embodiments described herein may be combined in various combinations. For example, one or more splitters may be included in any of the example embodiments described herein. In addition, various components, elements, and/or aspects of the different example embodiments may be duplicated or omitted in various possible combinations. Further, the various example optical vibration measurement systems described herein may be substantially closed systems such that no external or ambient light may affect the determination and/or measurement of vibrations based on emitted, transmitted, and/or reflected light by and between light sources, splitters, fiber optic cables, reflectors, components, and/or optical sensors.

Figure 4A:
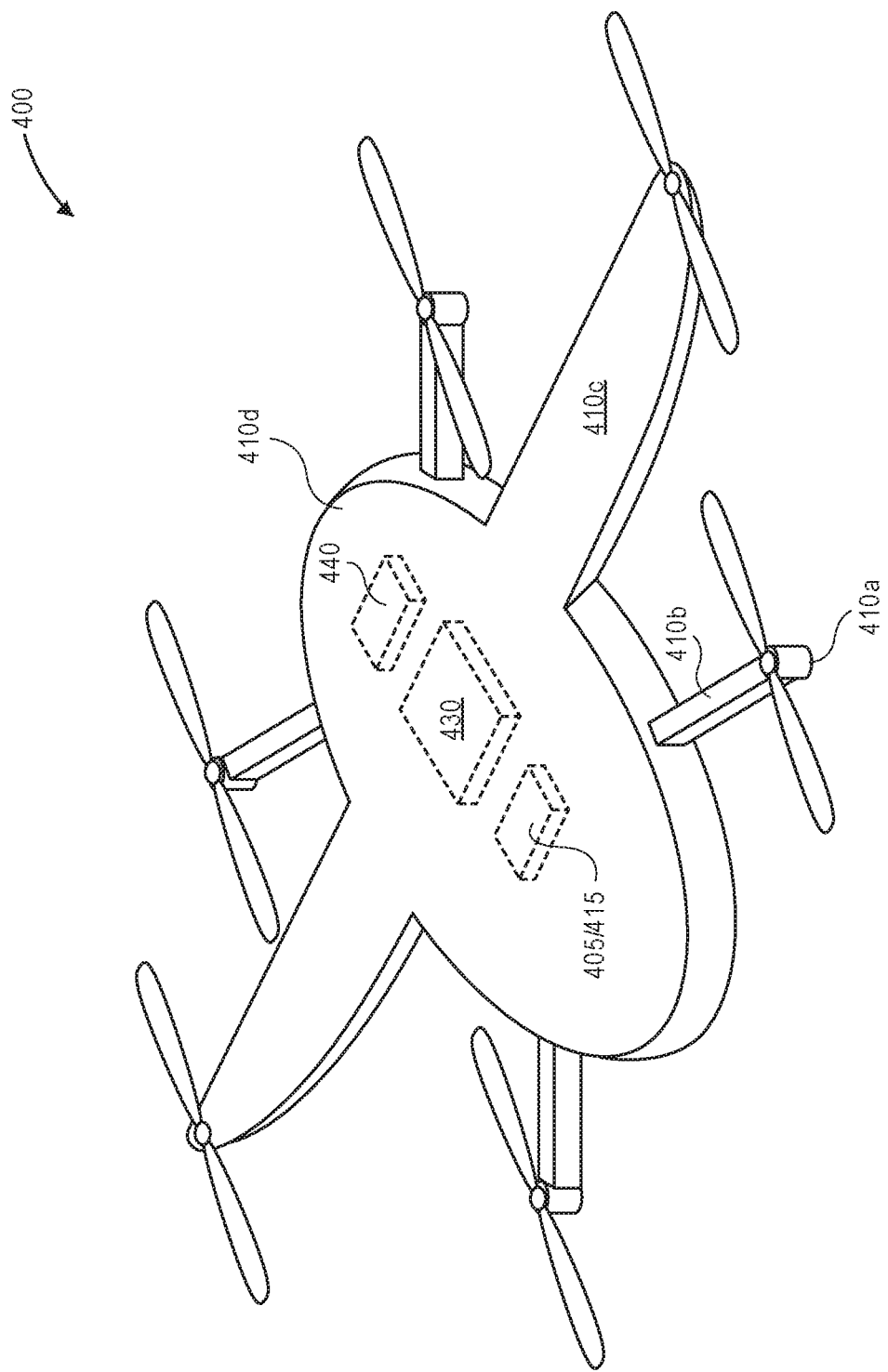
FIG. 4A is a schematic diagram of an example aerial vehicle, according to an implementation.

FIG. 4A is a schematic diagram of an example aerial vehicle 400, according to an implementation.

The example aerial vehicle 400, e.g., an unmanned aerial vehicle, may include one or more motors 410a configured to rotate one or more propellers, one or more motor arms 410b to which the motors 410a are coupled, one or more wings 410c to which one or more motors 410a may also be coupled, and a frame or fuselage 410d to which the motor arms 410b and/or wings 410c may be coupled. In addition, the fuselage 410d may comprise one or more controllers 430, one or more power supplies 440, electromechanical components (not shown), avionics components (not shown), sensors (not shown), and/or various other components associated with navigation, operation, or other functions of the example aerial vehicle 400.

In addition, all or portions of the example optical vibration measurement systems described herein may be included in one or more portions of the example aerial vehicle 400. For example, a light source 405 and an optical sensor 415 may be positioned in or coupled to the fuselage 410d. In example embodiments, the light source 405 and the optical sensor 415 may be coupled to a component or portion of the fuselage 410d that may be known to experience relatively little vibration, which may be determined via testing or other means. In this manner, vibrations of other components relative to a central, relatively stable baseline component or portion of the fuselage 410d may be determined. Further, by coupling the light source 405 and the optical sensor 415 and/or by placing the light source 405 and the optical sensor 415 proximate to each other, noise or other vibrations experienced by the light source 405 and the optical sensor 415 may be substantially canceled out, e.g., may act as an inertial canceling or removal unit, from the measured vibrations of other components or portions.

Further, one or more fiber optic cables to transmit emitted light from the light source 405 to one or more components of the example aerial vehicle 400, and/or one or more fiber optic cables to transmit reflected light from the one or more components of the example aerial vehicle 400 to the optical sensor 415 may be positioned in or coupled to portions of the fuselage 410d, wings 410c, and/or motor arms 410b. In addition, the various components of the example optical vibration measurement systems described herein may be positioned within internal portions of the example aerial vehicle 400, integrated with or formed as part of portions of the example aerial vehicle 400, and/or attached or coupled to external portions of the example aerial vehicle 400.

Furthermore, various components of the example aerial vehicle 400 may be measured to determine vibrations using the example optical vibration measurement systems described herein. For example, the motors 410a, one or more portions of the motor arms 410b, one or more portions of the wings 410c, one or more portions of the fuselage 410d, as well as one or more components positioned in or coupled to the example aerial vehicle 400, including controllers 430, power supplies 440, electromechanical components, avionics components, sensors, and/or various other components may be measured to determine vibrations.

Although FIG. 4A shows a particular configuration of an example aerial vehicle 400, the example optical vibration measurement systems described herein may be included in any other configurations of aerial vehicles, such as quadcopters, other hexacopters, octocopters, aerial vehicles having no wings, aerial vehicles having multiple wings, aerial vehicles including other propulsion mechanisms, aerial vehicles having other shapes or sizes, and/or various other types of aerial vehicles.

FIG. 4B is a schematic diagram of an example motor 410a of the example aerial vehicle 400 of FIG. 4A, according to an implementation.

As shown in FIG. 4B, the motor 410a may include a reflector 412a on a surface thereof. Using any of the various example optical vibration measurement systems described herein, emitted light may be transmitted from a light source 405 toward the reflector 412a, the reflector 412a may reflect the light, and the reflected light may be transmitted from the reflector 412a to an optical sensor 415. In addition, although not illustrated in FIG. 4B, the emitted light may be transmitted via a first fiber optic cable between the light source 405 and the reflector 412a, and the reflected light may be transmitted via a second fiber optic cable between the reflector 412a and the optical sensor 415. In alternative embodiments, instead of the reflector 412a, an optical sensor may be included on a surface of the motor 410a, and emitted light may be transmitted from a light source 405 toward the optical sensor included on the surface of the motor 410a. Using any of the various example optical vibration measurement systems described herein, vibrations associated with the motor 410a during an operation phase or other measurement phase of the aerial vehicle 400 may be measured.

FIG. 4C is a schematic diagram of an example wing 410c of the example aerial vehicle 400 of FIG. 4A, according to an implementation.

As shown in FIG. 4C, the wing 410c may include a reflector 412c on a surface thereof. Using any of the various example optical vibration measurement systems described herein, emitted light may be transmitted from a light source 405 toward the reflector 412c, the reflector 412c may reflect the light, and the reflected light may be transmitted from the reflector 412c to an optical sensor 415. In addition, although not illustrated in FIG. 4C, the emitted light may be transmitted via a first fiber optic cable between the light source 405 and the reflector 412c, and the reflected light may be transmitted via a second fiber optic cable between the reflector 412c and the optical sensor 415. In alternative embodiments, instead of the reflector 412c, an optical sensor may be included on a surface of the wing 410c, and emitted light may be transmitted from a light source 405 toward the optical sensor included on the surface of the wing 410c. Using any of the various example optical vibration measurement systems described herein, vibrations associated with the wing 410c during an operation phase or other measurement phase of the aerial vehicle 400 may be measured.

FIG. 4D is a schematic diagram of an example fuselage 410d of the example aerial vehicle 400 of FIG. 4A, according to an implementation.

As shown in FIG. 4D, the fuselage 410d may include a reflector 412d on a surface thereof, e.g., on a surface of a component positioned inside the fuselage 410d. Using any of the various example optical vibration measurement systems described herein, emitted light may be transmitted from a light source 405 toward the reflector 412d, the reflector 412d may reflect the light, and the reflected light may be transmitted from the reflector 412d to an optical sensor 415. In addition, although not illustrated in FIG. 4D, the emitted light may be transmitted via a first fiber optic cable between the light source 405 and the reflector 412d, and the reflected light may be transmitted via a second fiber optic cable between the reflector 412d and the optical sensor 415. In alternative embodiments, instead of the reflector 412d, an optical sensor may be included on a surface of the component positioned inside the fuselage 410d, and emitted light may be transmitted from a light source 405 toward the optical sensor included on the surface of the component positioned inside the fuselage 410*d*. Using any of the various example optical vibration measurement systems described herein, vibrations associated with the fuselage 410*d* during an operation phase or other measurement phase of the aerial vehicle 400 may be measured.

Although FIGS. 4A-4D show particular components or portions of an aerial vehicle as being measured to determine vibrations, various other components or portions of an aerial vehicle may also be measured to determine vibrations. For example, portions of the motor arms 410*b*, portions of the fuselage 410*d*, and/or various other components or portions of the aerial vehicle may be measured to determine vibrations. In addition, different sections or segments of various components or portions of the aerial vehicle may also be measured to determine vibrations associated with each of the different sections or segments. Further, various other systems, machines, devices, or vehicles, other than aerial vehicles, may also include components or portions thereof that may be measured to determine vibrations using the example optical vibration measurement systems described herein.

Based at least in part on measured vibrations experienced by one or more components or portions of an aerial vehicle, various actions may be initiated. For example, operation of the aerial vehicle may be altered or changed to thereby change the vibrations experienced by one or more components or portions of an aerial vehicle. In example embodiments, aspects associated with motor or propulsion mechanism operation such as speed, torque, or other aspects may be changed, aspects associated with propeller operation such as blade pitch, blade angle, blade surface treatments, or other aspects may be changed, aspects associated with wing operation such as wing angle, wing surface treatments, control surfaces, or other aspects may be changed, and/or aspects associated with flight or navigation such as heading, altitude, speed, acceleration, flight plan, or other aspects may be changed.

In other example embodiments, based at least in part on measured vibrations experienced by one or more components or portions of an aerial vehicle, a health of one or more components or portions of an aerial vehicle may be determined to facilitate predictive maintenance and/or repairs, beyond any normally scheduled preventative maintenance. For example, with reference to a physics model of an aerial vehicle, the health of one or more components or portions of an aerial vehicle may be determined by providing as inputs measured vibrations of various components or portions to the physics model, which may then provide output such as an expected remaining life of various components or portions. In addition, with reference to machine learning models, the health of one or more components or portions of an aerial vehicle may be determined by providing as inputs measured vibrations of various components or portions to the machine learning models, which may then provide output such as an expected remaining life of various components or portions. Based at least in part on such outputs, predictive maintenance or repairs to the aerial vehicle may be scheduled and/or conducted to avoid faults or failures to such components during operation. Such determinations of expected remaining life of various components or portions of an aerial vehicle based on measured vibrations may be particularly useful for components or portions that are difficult to inspect for wear, fatigue, high cycle fatigue, or other indicators of stress, including components or portions made of materials such as carbon fiber or other similar materials that may exhibit few, if any, visual indicators of stress.

Figure 5:
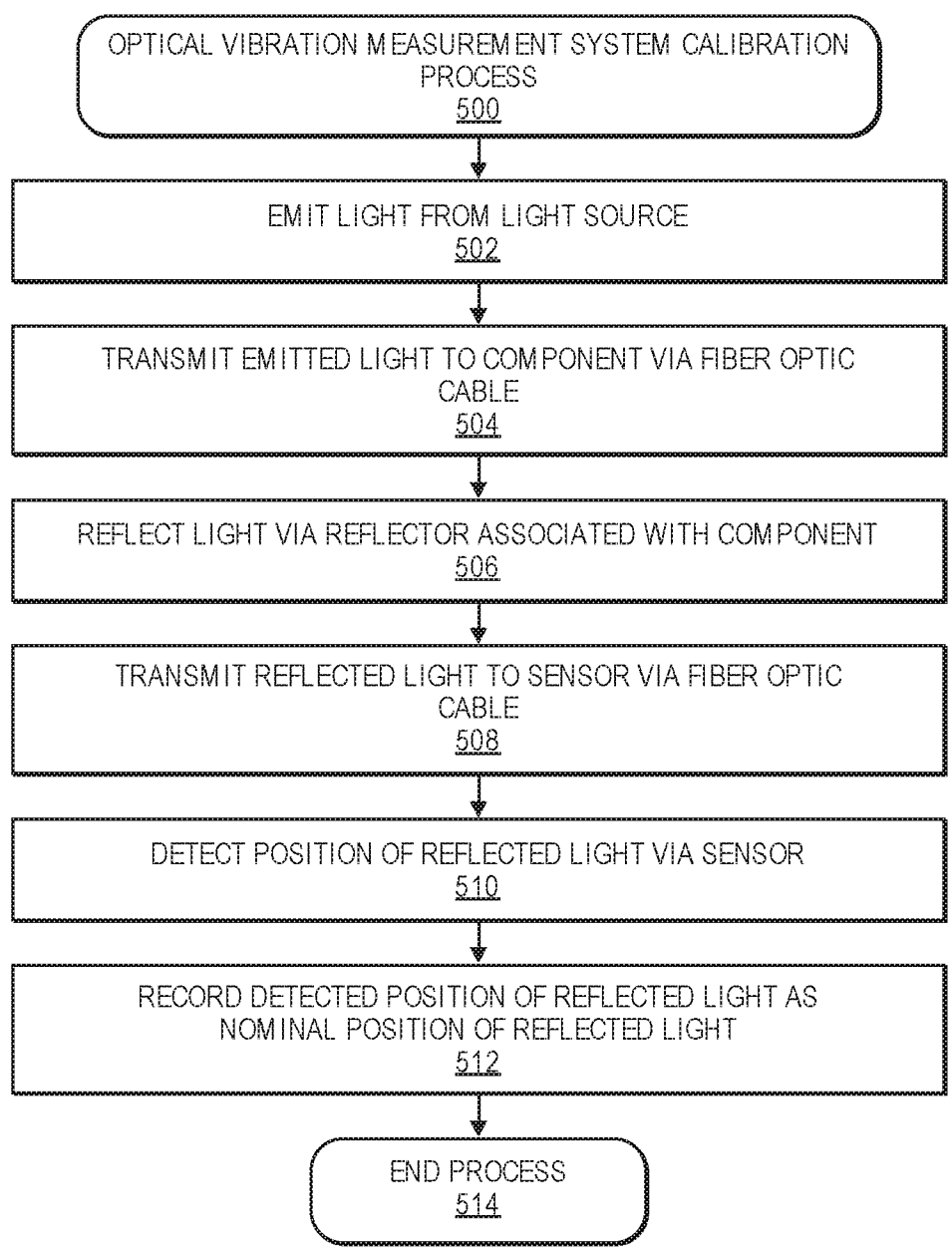
FIG. 5 is a flow diagram illustrating an example optical vibration measurement system calibration process, according to an implementation.

FIG. 5 is a flow diagram illustrating an example optical vibration measurement system calibration process 500, according to an implementation.

The process 500 may begin by emitting light from a light source, as at 502. Using any of the example optical vibration measurement systems described herein, various pulses and/or wavelengths of various types of light may be emitted from a light source toward a component to be measured.

The process 500 may continue by transmitting the emitted light to the component via a fiber optic cable, as at 504. For example, the component may not be in a direct line of sight of the light source, and the fiber optic cable may enable transmission of the emitted light to a component that is situated outside of direct line of sight. In addition, the fiber optic cable may enable transmission of the emitted light to a component that is relatively far from the light source with little or no attenuation of the emitted light. In this manner, the fiber optic cable may enable transmission of emitted light to a component that is distant and/or not in direct line of sight by a light source having relatively low power consumption due to the reduced attenuation of the emitted light via the fiber optic cable.

The process 500 may proceed by reflecting the light via a reflector associated with the component, as at 506. For example, the emitted light may be directed toward the reflector from the fiber optic cable, and the reflector may reflect the light back toward an optical sensor.

The process 500 may then continue by transmitting the reflected light to the optical sensor via a fiber optic cable, as at 508. For example, the optical sensor may not be in a direct line of sight of the reflector, and the fiber optic cable may enable transmission of the reflected light to an optical sensor that is situated outside of direct line of sight. In addition, the fiber optic cable may enable transmission of the reflected light to an optical sensor that is relatively far from the reflector with little or no attenuation of the reflected light. In this manner, the fiber optic cable may enable transmission of reflected light to an optical sensor that is distant and/or not in direct line of sight from a reflector associated with a component due to the reduced attenuation of the reflected light via the fiber optic cable.

The process 500 may then proceed to detect a position of the reflected light via the optical sensor, as at 510. For example, the optical sensor may be photodetector, a photosensor, or other similar optical sensor. As described herein, the position and/or other aspects of the reflected light received by the optical sensor may be calibrated and/or modified, e.g., may be calibrated to a desired position such as a center of the optical sensor. Various aspects of the example optical vibration measurement systems may be calibrated or adjusted, such as power, phase, wavelength, frequency, position, angle, or other aspects of the light source; length, size, diameter, position, angle, number of optical fibers, or other aspects of the fiber optic cables; position, angle, material properties, surface properties, or other aspects of the reflector; and/or position, angle, size, photosensitivity, or other aspects of the optical sensor.

The process 500 may then continue to record the detected position of the reflected light as the nominal position of the reflected light, as at 512. For example, the nominal or calibrated position of the reflected light may be recorded and/or stored in one or more data stores or memories. The recorded nominal position of reflected light may indicate a desired or optimal position of reflected light during a non-operation phase or other calibration phase of a system that comprises the component to be measured. The process 500 may then end, as at 514.

Figure 6:
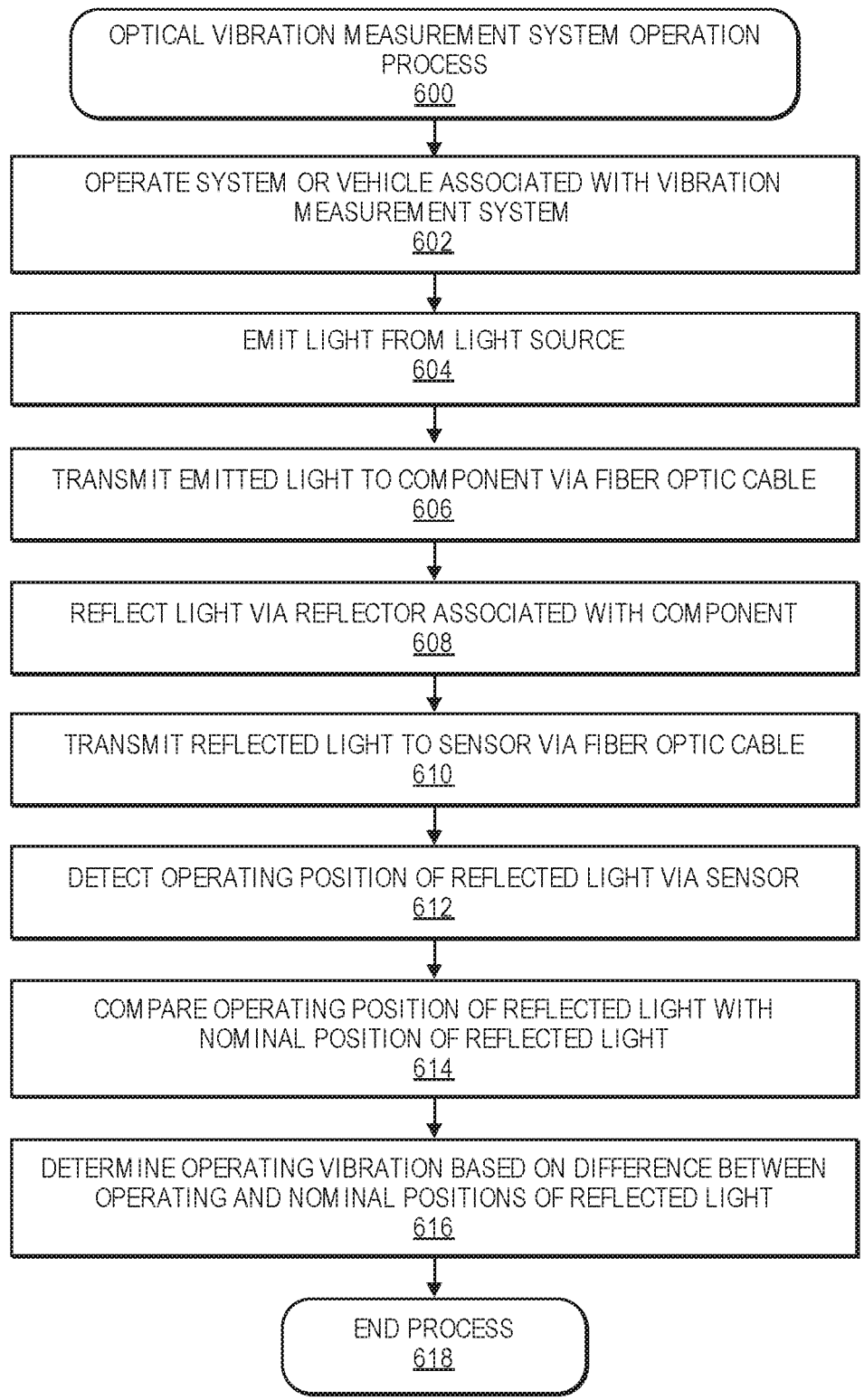
FIG. 6 is a flow diagram illustrating an example optical vibration measurement system operation process, according to an implementation.

FIG. 6 is a flow diagram illustrating an example optical vibration measurement system operation process 600, according to an implementation.

The process 600 may begin by operating a system or vehicle associated with an optical vibration measurement system, as at 602. For example, a system, machine, device, or vehicle comprising a component to be measured may be operated or initiated. In example embodiments of an aerial vehicle, one or more motors or propulsion mechanisms, one or more controllers, one or more electromechanical components, one or more avionics components, one or more sensors, and/or one or more other components may be operated or initiated. The aerial vehicle may be operated or initiated on a testbed or other testing apparatus. In some example embodiments, one or more vibration profiles or test profiles may be initiated via a testbed or other testing apparatus to inject particular known vibrations and measure resulting vibrations of one or more components. Alternatively, the aerial vehicle may be operated or initiated in test flight or actual flight modes.

The process 600 may proceed by emitting light from a light source, as at 604. Using any of the example optical vibration measurement systems described herein, various pulses and/or wavelengths of various types of light may be emitted from a light source toward the component to be measured comprised in the system, machine, device, or vehicle that has been operated or initiated.

The process 600 may continue by transmitting the emitted light to the component via a fiber optic cable, as at 606. For example, the component may not be in a direct line of sight of the light source, and the fiber optic cable may enable transmission of the emitted light to a component that is situated outside of direct line of sight. In addition, the fiber optic cable may enable transmission of the emitted light to a component that is relatively far from the light source with little or no attenuation of the emitted light. In this manner, the fiber optic cable may enable transmission of emitted light to a component that is distant and/or not in direct line of sight by a light source having relatively low power consumption due to the reduced attenuation of the emitted light via the fiber optic cable.

The process 600 may proceed by reflecting the light via a reflector associated with the component, as at 608. For example, the emitted light may be directed toward the reflector from the fiber optic cable, and the reflector may reflect the light back toward an optical sensor.

The process 600 may then continue by transmitting the reflected light to the optical sensor via a fiber optic cable, as at 610. For example, the optical sensor may not be in a direct line of sight of the reflector, and the fiber optic cable may enable transmission of the reflected light to an optical sensor that is situated outside of direct line of sight. In addition, the fiber optic cable may enable transmission of the reflected light to an optical sensor that is relatively far from the reflector with little or no attenuation of the reflected light. In this manner, the fiber optic cable may enable transmission of reflected light to an optical sensor that is distant and/or not in direct line of sight from a reflector associated with a component due to the reduced attenuation of the reflected light via the fiber optic cable.

The process 600 may then proceed to detect an operating position of the reflected light via the optical sensor, as at 612. For example, the optical sensor may be photodetector, a photosensor, or other similar optical sensor. As described herein, the operating position and/or other aspects of the reflected light received by the optical sensor may be detected and/or determined.

The process 600 may then continue to compare the operating position of the reflected light with the nominal position of the reflected light, as at 614. For example, the operating position of reflected light may indicate one or more changes to the position or other aspects of the reflected light relative to a nominal position stored in memory. As described herein, the one or more changes to the position of the reflected light may include horizontal and/or vertical shifts in position and/or may include various types of oscillation indicative of vibrations. In addition, the one or more changes to aspects of the reflected light may include changes to phase, wavelength, frequency, or other aspects of the reflected light that may be indicative of vibrations.

The process 600 may then proceed to determine an operating vibration based on a difference between the operating and nominal positions of the reflected light, as at 616. For example, various aspects of an operating vibration may be determined, such as a type, amplitude, frequency, duration, or other aspects of the operating vibration. Further, other aspects associated with the operating vibration may be determined and/or calculated, such as a peak value, a peak-to-peak value, a root-mean-square (RMS) value, or other aspects. Generally, the RMS value of a vibration signal may be considered to correspond to a statistical mean, a quadratic mean, or a power of the vibration signal.

The operating vibration and various aspects thereof may be determined based at least in part on reference values associated with known vibration signals stored in one or more data stores or memories. For example, one or more lookup tables may be stored in memory with known vibration signals and associated reference values of various aspects of such signals, and the operating vibration may be determined based at least in part on a comparison of the detected difference between the operating position and the nominal position with the stored values in the lookup tables. In other example embodiments, various known processes and/or algorithms related to vibration signals may be performed based at least in part on the detected difference between the operating position and the nominal position to determine the operating vibration and various aspects thereof.

Moreover, based at least in part on determined operating vibrations experienced by one or more components or portions of a system, machine, device, or vehicle, various actions may be initiated. For example, operation of the system, machine, device, or vehicle may be altered or changed to thereby change the vibrations experienced by one or more components or portions of the system, machine, device, or vehicle. In example embodiments of an aerial vehicle, aspects associated with motor or propulsion mechanism operation such as speed, torque, or other aspects may be changed; aspects associated with propeller operation such as blade pitch, blade angle, blade surface treatments, or other aspects may be changed; aspects associated with wing operation such as wing angle, wing surface treatments, control surfaces, or other aspects may be changed; and/or aspects associated with flight or navigation such as heading, altitude, speed, acceleration, flight plan, or other aspects may be changed.

In other example embodiments, based at least in part on determined operating vibrations experienced by one or more components or portions of a system, machine, device, or vehicle, a health of one or more components or portions of the system, machine, device, or vehicle may be determined to facilitate predictive maintenance and/or repairs, beyond any normally scheduled preventative maintenance. For example, with reference to a physics model of the system, machine, device, or vehicle, the health of one or more components or portions of the system, machine, device, or vehicle may be determined by providing as inputs operating vibrations of various components or portions to the physics model, which may then provide output such as an expected remaining life of various components or portions. In addition, with reference to machine learning models, the health of one or more components or portions of the system, machine, device, or vehicle may be determined by providing as inputs operating vibrations of various components or portions to the machine learning models, which may then provide output such as an expected remaining life of various components or portions. Based at least in part on such outputs, predictive maintenance or repairs to the system, machine, device, or vehicle may be scheduled and/or conducted to avoid faults or failures to such components during operation. Such determinations of expected remaining life of various components or portions of the system, machine, device, or vehicle based on operating vibrations may be particularly useful for components or portions that are difficult to inspect for wear, fatigue, high cycle fatigue, or other indicators of stress, including components or portions made of materials such as carbon fiber or other similar materials that may exhibit few, if any, visual indicators of stress.

Figure 7:
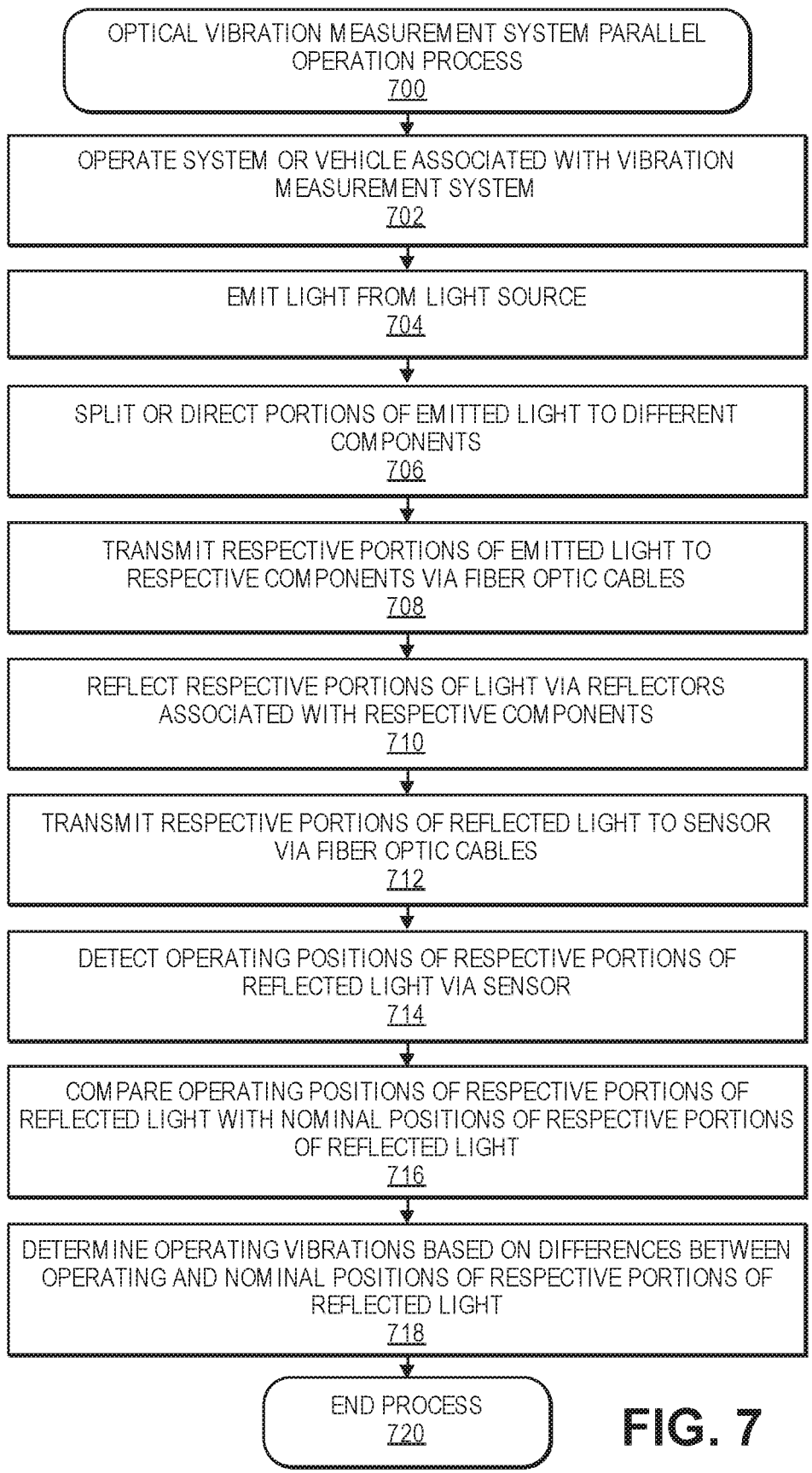
FIG. 7 is a flow diagram illustrating an example optical vibration measurement system parallel operation process, according to an implementation.

FIG. 7 is a flow diagram illustrating an example optical vibration measurement system parallel operation process 700, according to an implementation.

The process 700 may begin by operating a system or vehicle associated with an optical vibration measurement system, as at 702. For example, a system, machine, device, or vehicle comprising a component to be measured may be operated or initiated. In example embodiments of an aerial vehicle, one or more motors or propulsion mechanisms, one or more controllers, one or more electromechanical components, one or more avionics components, one or more sensors, and/or one or more other components may be operated or initiated. The aerial vehicle may be operated or initiated on a testbed or other testing apparatus. In some example embodiments, one or more vibration profiles or test profiles may be initiated via a testbed or other testing apparatus to inject particular known vibrations and measure resulting vibrations of one or more components. Alternatively, the aerial vehicle may be operated or initiated in test flight or actual flight modes.

The process 700 may proceed by emitting light from a light source, as at 704. Using any of the example optical vibration measurement systems described herein, various pulses and/or wavelengths of various types of light may be emitted from a light source toward the component to be measured comprised in the system, machine, device, or vehicle that has been operated or initiated.

The process 700 may then proceed to split or direct portions of emitted light to different components, as at 706. For example, a splitter may direct or split respective pulses and/or wavelengths of light to respective reflectors associated with components to be measured. In example embodiments, the splitter may direct a first pulse and/or a first wavelength of light to a first reflector associated with a first component, the splitter may direct a second pulse and/or a second wavelength of light to a second reflector associated with a second component, and so on. The selective splitting and/or direction of portions of light to respective reflectors and components may enable differentiation of light that is reflected back to an optical sensor from each of the respective reflectors and components.

The process 700 may continue by transmitting respective portions of the emitted light to respective components via fiber optic cables, as at 708. For example, the components may not be in a direct line of sight of the light source, and the fiber optic cables may enable transmission of portions of the emitted light to components that are situated outside of direct line of sight. In addition, the fiber optic cables may enable transmission of portions of the emitted light to components that are relatively far from the light source with little or no attenuation of portions of the emitted light. In this manner, the fiber optic cables may enable transmission of portions of emitted light to components that are distant and/or not in direct line of sight by a light source having relatively low power consumption due to the reduced attenuation of portions of the emitted light via the fiber optic cables.

The process 700 may proceed by reflecting respective portions of the light via reflectors associated with the respective components, as at 710. For example, portions of the emitted light may be directed toward the reflectors from the fiber optic cables, and the reflectors may reflect the portions of light back toward an optical sensor.

The process 700 may then continue by transmitting respective portions of the reflected light to the optical sensor via fiber optic cables, as at 712. For example, the optical sensor may not be in a direct line of sight of the reflectors, and the fiber optic cables may enable transmission of portions of the reflected light to an optical sensor that is situated outside of direct line of sight. In addition, the fiber optic cables may enable transmission of portions of the reflected light to an optical sensor that is relatively far from the reflectors with little or no attenuation of portions of the reflected light. In this manner, the fiber optic cables may enable transmission of portions of reflected light to an optical sensor that is distant and/or not in direct line of sight from reflectors associated with respective components due to the reduced attenuation of portions of the reflected light via the fiber optic cables.

The process 700 may then proceed to detect operating positions of respective portions of the reflected light via the optical sensor, as at 714. For example, the optical sensor may be photodetector, a photosensor, or other similar optical sensor. As described herein, the operating positions and/or other aspects of portions of the reflected light received by the optical sensor may be detected and/or determined.

The process 700 may then continue to compare the operating positions of respective portions of the reflected light with the nominal positions of respective portions of the reflected light, as at 716. For example, the operating positions of portions of reflected light may indicate one or more changes to the positions or other aspects of portions of the reflected light relative to nominal positions stored in memory. As described herein, the one or more changes to the positions of portions of the reflected light may include horizontal and/or vertical shifts in positions and/or may include various types of oscillation indicative of vibrations. In addition, the one or more changes to aspects of portions of the reflected light may include changes to phase, wavelength, frequency, or other aspects of portions of the reflected light that may be indicative of vibrations.

As described herein, by transmitting different respective pulses and/or wavelengths of light to reflectors associated with respective components, the different reflected respective pulses and/or wavelengths of light received by the optical sensor from the reflectors may be differentiated or distinguished from each other. Various combinations of different respective pulses and/or wavelengths of light may be received by a single optical sensor and distinguished or differentiated from each other based at least in part on characteristics associated with the respective pulses and/or wavelengths of light, such as the different timing or other characteristics of respective pulses of light and/or the different wavelengths of respective portions of light.

The process 700 may then proceed to determine operating vibrations based on differences between the operating and nominal positions of respective portions of the reflected light, as at 718. For example, various aspects of operating vibrations may be determined, such as a type, amplitude, frequency, duration, or other aspects of the operating vibrations. Further, other aspects associated with the operating vibrations may be determined and/or calculated, such as a peak value, a peak-to-peak value, a root-mean-square (RMS) value, or other aspects. Generally, the RMS value of a vibration signal may be considered to correspond to a statistical mean, a quadratic mean, or a power of the vibration signal.

The operating vibrations and various aspects thereof may be determined based at least in part on reference values associated with known vibration signals stored in one or more data stores or memories. For example, one or more lookup tables may be stored in memory with known vibration signals and associated reference values of various aspects of such signals, and the operating vibrations may be determined based at least in part on a comparison of the detected differences between the operating positions and the nominal positions with the stored values in the lookup tables. In other example embodiments, various known processes and/or algorithms related to vibration signals may be performed based at least in part on the detected differences between the operating positions and the nominal positions to determine the operating vibrations and various aspects thereof.

Moreover, based at least in part on determined operating vibrations experienced by one or more components or portions of a system, machine, device, or vehicle, various actions may be initiated. For example, operation of the system, machine, device, or vehicle may be altered or changed to thereby change the vibrations experienced by one or more components or portions of the system, machine, device, or vehicle. In example embodiments of an aerial vehicle, aspects associated with motor or propulsion mechanism operation such as speed, torque, or other aspects may be changed; aspects associated with propeller operation such as blade pitch, blade angle, blade surface treatments, or other aspects may be changed; aspects associated with wing operation such as wing angle, wing surface treatments, control surfaces, or other aspects may be changed; and/or aspects associated with flight or navigation such as heading, altitude, speed, acceleration, flight plan, or other aspects may be changed.

In other example embodiments, based at least in part on determined operating vibrations experienced by one or more components or portions of a system, machine, device, or vehicle, a health of one or more components or portions of the system, machine, device, or vehicle may be determined to facilitate predictive maintenance and/or repairs, beyond any normally scheduled preventative maintenance. For example, with reference to a physics model of the system, machine, device, or vehicle, the health of one or more components or portions of the system, machine, device, or vehicle may be determined by providing as inputs operating vibrations of various components or portions to the physics model, which may then provide output such as an expected remaining life of various components or portions. In addition, with reference to machine learning models, the health of one or more components or portions of the system, machine, device, or vehicle may be determined by providing as inputs operating vibrations of various components or portions to the machine learning models, which may then provide output such as an expected remaining life of various components or portions. Based at least in part on such outputs, predictive maintenance or repairs to the system, machine, device, or vehicle may be scheduled and/or conducted to avoid faults or failures to such components during operation. Such determinations of expected remaining life of various components or portions of the system, machine, device, or vehicle based on operating vibrations may be particularly useful for components or portions that are difficult to inspect for wear, fatigue, high cycle fatigue, or other indicators of stress, including components or portions made of materials such as carbon fiber or other similar materials that may exhibit few, if any, visual indicators of stress.

Figure 8A:
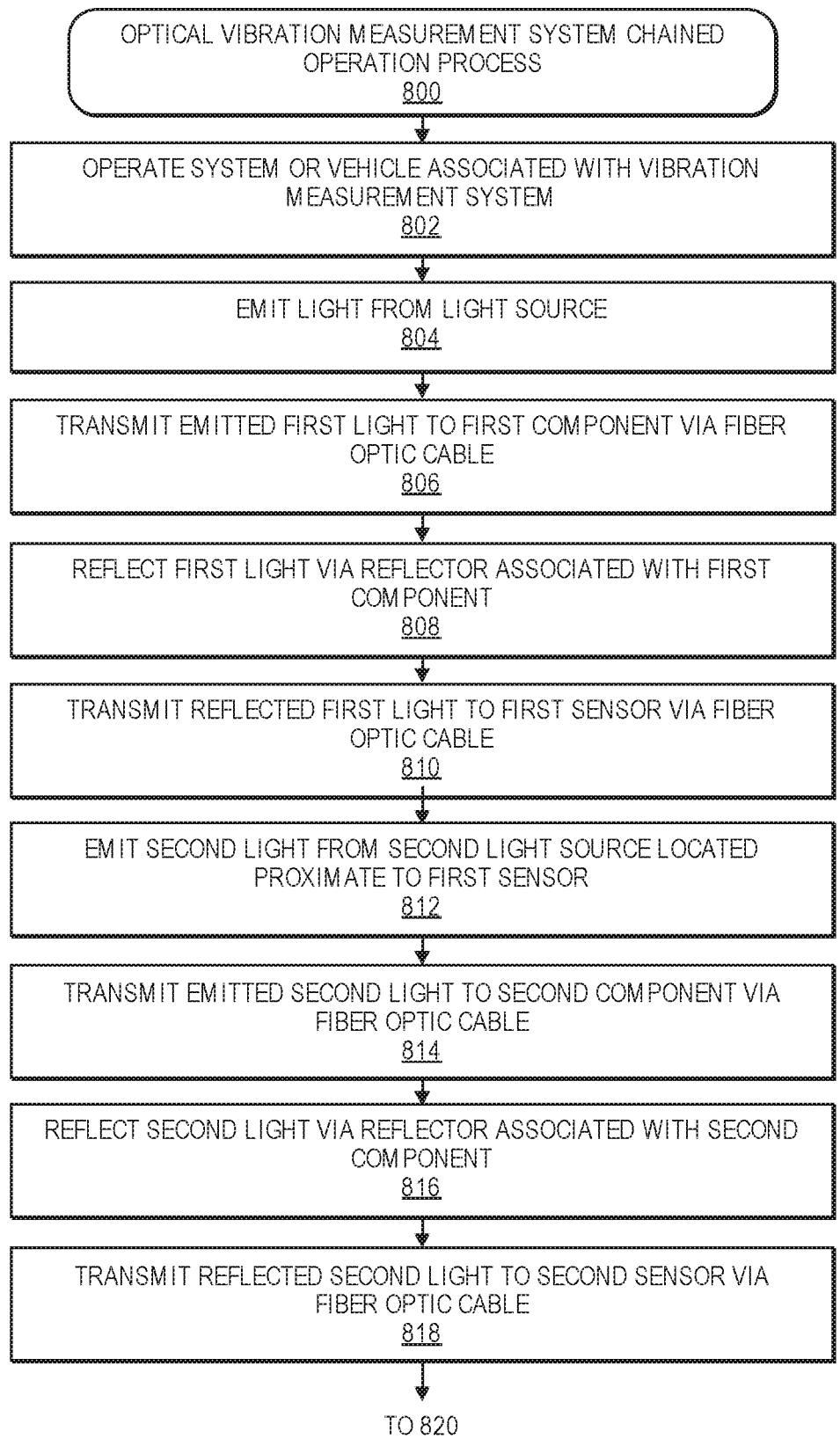
FIGS. 8A and 8B is a flow diagram illustrating an example optical vibration measurement system chained operation process, according to an implementation.
Figure 8B:
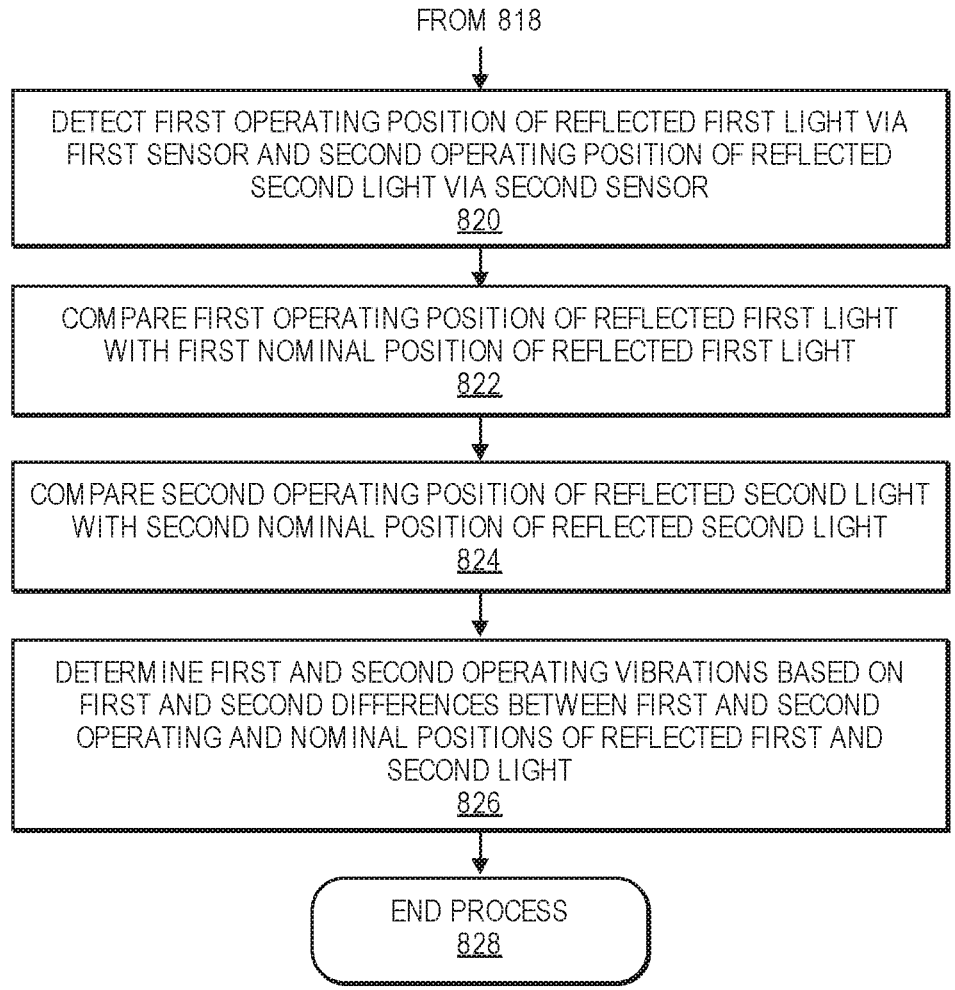

FIGS. 8A and 8B is a flow diagram illustrating an example optical vibration measurement system chained operation process 800, according to an implementation.

The process 800 may begin by operating a system or vehicle associated with an optical vibration measurement system, as at 802. For example, a system, machine, device, or vehicle comprising a component to be measured may be operated or initiated. In example embodiments of an aerial vehicle, one or more motors or propulsion mechanisms, one or more controllers, one or more electromechanical components, one or more avionics components, one or more sensors, and/or one or more other components may be operated or initiated. The aerial vehicle may be operated or initiated on a testbed or other testing apparatus. In some example embodiments, one or more vibration profiles or test profiles may be initiated via a testbed or other testing apparatus to inject particular known vibrations and measure resulting vibrations of one or more components. Alternatively, the aerial vehicle may be operated or initiated in test flight or actual flight modes.

The process 800 may proceed by emitting first light from a first light source, as at 804. Using any of the example optical vibration measurement systems described herein, various pulses and/or wavelengths of various types of light may be emitted from a first light source toward the first component to be measured comprised in the system, machine, device, or vehicle that has been operated or initiated.

The process 800 may continue by transmitting the emitted first light to the first component via a fiber optic cable, as at 806. For example, the first component may not be in a direct line of sight of the first light source, and the fiber optic cable may enable transmission of the emitted first light to the first component that is situated outside of direct line of sight. In addition, the fiber optic cable may enable transmission of the emitted first light to the first component that is relatively far from the first light source with little or no attenuation of the emitted first light. In this manner, the fiber optic cable may enable transmission of emitted first light to the first component that is distant and/or not in direct line of sight by a first light source having relatively low power consumption due to the reduced attenuation of the emitted first light via the fiber optic cable.

The process 800 may proceed by reflecting the first light via a reflector associated with the first component, as at 808. For example, the emitted first light may be directed toward the reflector from the fiber optic cable, and the reflector may reflect the first light back toward a first optical sensor.

The process 800 may then continue by transmitting the reflected first light to the first optical sensor via a fiber optic cable, as at 810. For example, the first optical sensor may not be in a direct line of sight of the reflector, and the fiber optic cable may enable transmission of the reflected first light to a first optical sensor that is situated outside of direct line of sight. In addition, the fiber optic cable may enable transmission of the reflected first light to a first optical sensor that is relatively far from the reflector with little or no attenuation of the reflected first light. In this manner, the fiber optic cable may enable transmission of reflected first light to a first optical sensor that is distant and/or not in direct line of sight from the reflector associated with the first component due to the reduced attenuation of the reflected first light via the fiber optic cable.

The process 800 may proceed by emitting second light from a second light source located proximate the first optical sensor, as at 812. Using any of the example optical vibration measurement systems described herein, various pulses and/or wavelengths of various types of light may be emitted from a second light source toward the second component to be measured comprised in the system, machine, device, or vehicle that has been operated or initiated.

The process 800 may continue by transmitting the emitted second light to the second component via a fiber optic cable, as at 814. For example, the second component may not be in a direct line of sight of the second light source, and the fiber optic cable may enable transmission of the emitted second light to the second component that is situated outside of direct line of sight. In addition, the fiber optic cable may enable transmission of the emitted second light to the second component that is relatively far from the second light source with little or no attenuation of the emitted second light. In this manner, the fiber optic cable may enable transmission of emitted second light to the second component that is distant and/or not in direct line of sight by a second light source having relatively low power consumption due to the reduced attenuation of the emitted second light via the fiber optic cable.

The process 800 may proceed by reflecting the second light via a reflector associated with the second component, as at 816. For example, the emitted second light may be directed toward the reflector from the fiber optic cable, and the reflector may reflect the second light back toward a second optical sensor.

The process 800 may then continue by transmitting the reflected second light to the second optical sensor via a fiber optic cable, as at 818. For example, the second optical sensor may not be in a direct line of sight of the reflector, and the fiber optic cable may enable transmission of the reflected second light to a second optical sensor that is situated outside of direct line of sight. In addition, the fiber optic cable may enable transmission of the reflected second light to a second optical sensor that is relatively far from the reflector with little or no attenuation of the reflected second light. In this manner, the fiber optic cable may enable transmission of reflected second light to a second optical sensor that is distant and/or not in direct line of sight from the reflector associated with the second component due to the reduced attenuation of the reflected second light via the fiber optic cable.

The process 800 may then proceed to detect a first operating position of reflected first light via the first optical sensor and a second operating position of reflected second light via the second optical sensor, as at 820. For example, the first and second optical sensors may be photodetectors, photosensors, or other similar optical sensors. As described herein, the first and second operating positions and/or other aspects of the reflected first and second light received by the first and second optical sensors may be detected and/or determined.

The process 800 may then continue to compare the first operating position of the reflected first light with a first nominal position of the reflected first light, as at 822, and to compare the second operating position of the reflected second light with a second nominal position of the reflected second light, as at 824. For example, the operating positions of reflected light may indicate one or more changes to the positions or other aspects of portions of the reflected light relative to nominal positions stored in memory. As described herein, the one or more changes to the positions of portions of the reflected light may include horizontal and/or vertical shifts in positions and/or may include various types of oscillation indicative of vibrations. In addition, the one or more changes to aspects of portions of the reflected light may include changes to phase, wavelength, frequency, or other aspects of portions of the reflected light that may be indicative of vibrations.

As described herein, by configuring the light sources, reflectors associated with components, and optical sensors as a sequence or in series, e.g., in a chained configuration, detected changes in aspects of the reflected light received by the optical sensors may be processed to determine vibrations associated with each of the components individually, as well as to determine combined or coupled vibrations associated with various combinations of the components. For example, the detected changes in aspects of the reflected first light received by the first optical sensor may be processed to determine vibrations associated with the first component individually, e.g., by eliminating or normalizing for any noise or other vibrations experienced by each of the first light source and the first optical sensor. Likewise, the detected changes in aspects of the reflected second light received by the second optical sensor may be processed to determine vibrations associated with the second component individually, e.g., by eliminating or normalizing for any noise or other vibrations experienced by each of the second light source and the second optical sensor.

Further, if the first optical sensor and second light source are positioned proximate to the first component as part of the chained configuration, then the detected changes in aspects of the reflected second light received by the second optical sensor may also be processed to determine vibrations associated with the components in combination, e.g., by eliminating or normalizing for any noise or other vibrations experienced by each of the first light source and the second optical sensor. Various other vibrations associated with combinations of components may be determined based at least in part on the chained configuration of light sources, reflectors associated with components, and optical sensors.

The process 800 may then proceed to determine first and second operating vibrations based on first and second differences between the first and second operating and nominal positions of the reflected first and second light, as at 826. For example, various aspects of operating vibrations may be determined, such as a type, amplitude, frequency, duration, or other aspects of the operating vibrations. Further, other aspects associated with the operating vibrations may be determined and/or calculated, such as a peak value, a peak-to-peak value, a root-mean-square (RMS) value, or other aspects. Generally, the RMS value of a vibration signal may be considered to correspond to a statistical mean, a quadratic mean, or a power of the vibration signal.

The operating vibrations and various aspects thereof may be determined based at least in part on reference values associated with known vibration signals stored in one or more data stores or memories. For example, one or more lookup tables may be stored in memory with known vibration signals and associated reference values of various aspects of such signals, and the operating vibrations may be determined based at least in part on a comparison of the detected differences between the operating positions and the nominal positions with the stored values in the lookup tables. In other example embodiments, various known processes and/or algorithms related to vibration signals may be performed based at least in part on the detected differences between the operating positions and the nominal positions to determine the operating vibrations and various aspects thereof.

Moreover, based at least in part on determined operating vibrations experienced by one or more components or portions of a system, machine, device, or vehicle, various actions may be initiated. For example, operation of the system, machine, device, or vehicle may be altered or changed to thereby change the vibrations experienced by one or more components or portions of the system, machine, device, or vehicle. In example embodiments of an aerial vehicle, aspects associated with motor or propulsion mechanism operation such as speed, torque, or other aspects may be changed; aspects associated with propeller operation such as blade pitch, blade angle, blade surface treatments, or other aspects may be changed; aspects associated with wing operation such as wing angle, wing surface treatments, control surfaces, or other aspects may be changed; and/or aspects associated with flight or navigation such as heading, altitude, speed, acceleration, flight plan, or other aspects may be changed.

In other example embodiments, based at least in part on determined operating vibrations experienced by one or more components or portions of a system, machine, device, or vehicle, a health of one or more components or portions of the system, machine, device, or vehicle may be determined to facilitate predictive maintenance and/or repairs, beyond any normally scheduled preventative maintenance. For example, with reference to a physics model of the system, machine, device, or vehicle, the health of one or more components or portions of the system, machine, device, or vehicle may be determined by providing as inputs operating vibrations of various components or portions to the physics model, which may then provide output such as an expected remaining life of various components or portions. In addition, with reference to machine learning models, the health of one or more components or portions of the system, machine, device, or vehicle may be determined by providing as inputs operating vibrations of various components or portions to the machine learning models, which may then provide output such as an expected remaining life of various components or portions. Based at least in part on such outputs, predictive maintenance or repairs to the system, machine, device, or vehicle may be scheduled and/or conducted to avoid faults or failures to such components during operation. Such determinations of expected remaining life of various components or portions of the system, machine, device, or vehicle based on operating vibrations may be particularly useful for components or portions that are difficult to inspect for wear, fatigue, high cycle fatigue, or other indicators of stress, including components or portions made of materials such as carbon fiber or other similar materials that may exhibit few, if any, visual indicators of stress.

Figure 9:
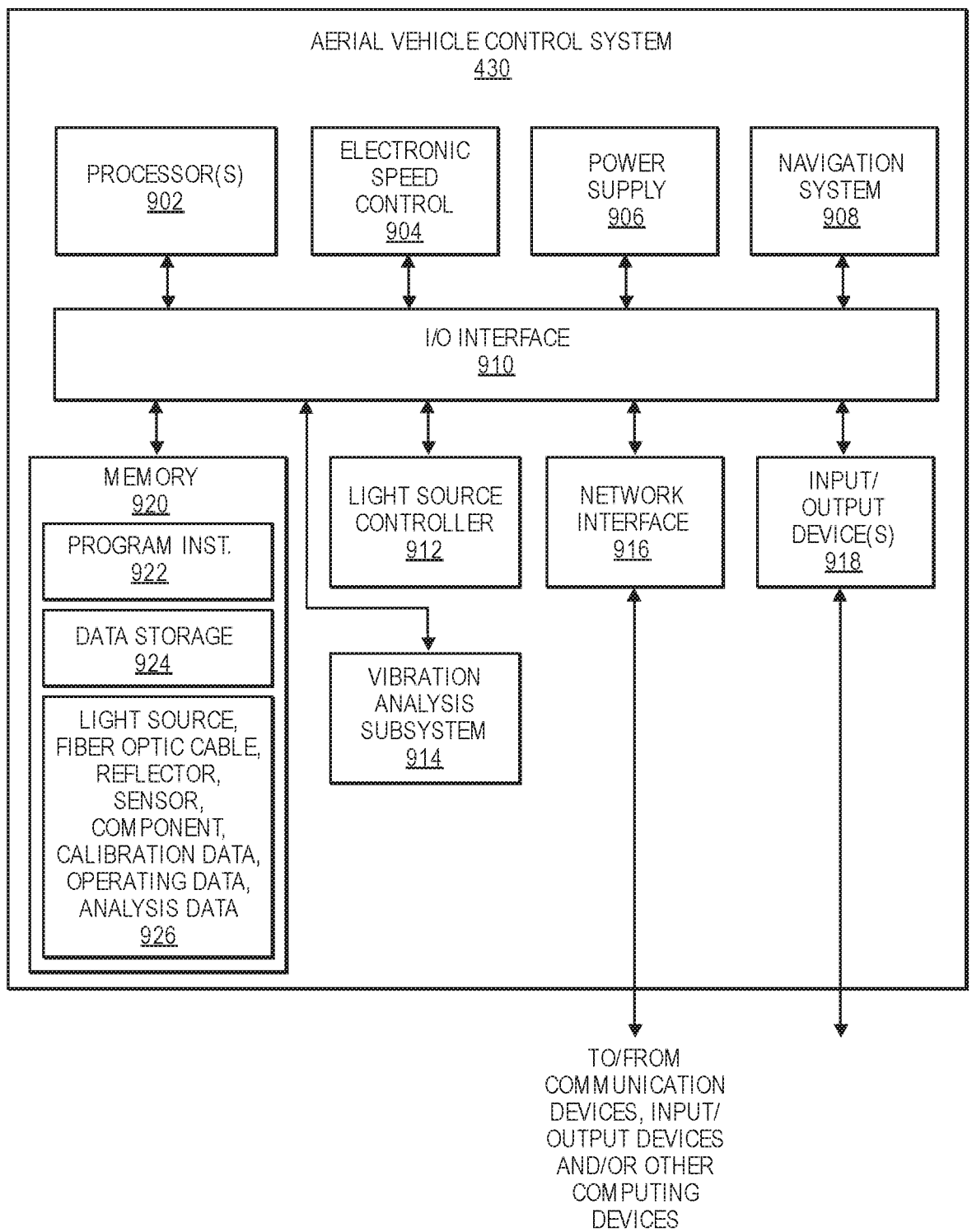
FIG. 9 is a block diagram illustrating various components of an aerial vehicle control system, according to an implementation.

FIG. 9 is a block diagram illustrating various components of an aerial vehicle control system 430, according to an implementation.

In various examples, the block diagram may be illustrative of one or more aspects of the aerial vehicle control system 430 that may be used to implement the various systems and processes discussed above. In the illustrated implementation, the aerial vehicle control system 430 includes one or more processors 902, coupled to a non-transitory computer readable storage medium 920 via an input/output (I/O) interface 910. The aerial vehicle control system 430 may also include a propulsion controller or electronic speed control 904, a power supply/controller module 906 and/or a navigation system 908. The aerial vehicle control system 430 further includes a light source controller 912, a vibration analysis subsystem 914, a network interface 916, and one or more input/output devices 918.

In various implementations, the aerial vehicle control system 430 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, light source and/or splitter data, fiber optic cable data, reflector data, sensor data, component data, calibration data, operating data, analysis data, and/or other data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922, data storage 924 and other data items 926, respectively. In other implementations, program instructions, data and/or other data items may be received, sent or stored upon different types of computer-accessible media, such as non-transitory media, or on similar media separate from the non-transitory computer readable storage medium 920 or the aerial vehicle control system 430. The other data items 926 may include various data related to any and all components of the example optical vibration measurement systems described herein, components to be measured, systems, machines, devices, or vehicles comprising the components to be measured, detected or measured data from the example optical vibration measurement systems, processed or analyzed data associated with the example optical vibration measurement systems, and/or any other data items associated with systems and methods for optical vibration measurement described herein.

Generally speaking, a non-transitory, computer readable storage medium may include storage media or memory media such as magnetic or optical media, e.g., disk or CD/DVD-ROM, coupled to the aerial vehicle control system 430 via the I/O interface 910. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface 916 or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The propulsion controller or electronic speed control 904 communicates with the navigation system 908 and adjusts the operational characteristics of each propulsion mechanism to guide the aerial vehicle along a determined flight path and/or to perform other navigational maneuvers. The navigation system 908 may include a GPS or other similar system than can be used to navigate the aerial vehicle to and/or from a location.

The aerial vehicle control system 430 may also include a light source controller 912. The light source controller 912 may communicate with light sources and/or splitters of the example optical vibration measurement systems described herein, as well as other components thereof, and the light source controller 912 may control the emission of light and/or the splitting or direction of such emitted light. For example, the light source controller 912 may instruct the emission of particular pulses and/or wavelengths of light. In addition, the light source controller 912 may also control other aspects of light emitted by the light sources and/or splitters. Further, the light source controller 912 may control various other aspects of the light sources, splitters, and/or emitted light, as further described herein.

The aerial vehicle control system 430 may also include a vibration analysis subsystem 914. The vibration analysis subsystem 914 may communicate with the optical sensors of the example optical vibration measurement systems described herein, as well as other components thereof, and the vibration analysis subsystem 914 may receive data associated with detected nominal and/or operating positions of received light from the optical sensors. For example, the vibration analysis subsystem 914 may process the data to calibrate the nominal positions of the example optical vibration measurement systems described herein, and/or may process the data to determine changes in the operating positions with respect to the nominal positions. In addition, the vibration analysis subsystem 914 may process the data to further determine operating vibrations associated with one or more components of a system to be measured. In example embodiments, the operating vibrations may be determined with reference to lookup tables including known vibration profiles and their associated characteristics, with reference to one or more physics models associated with the component and/or system to be measured, and/or with reference to one or more machine learning models trained with data associated with the component and/or system to be measured. Further, based at least in part on the determined operating vibrations, the vibration analysis subsystem 914 may also instruct changes to operations of the component and/or system to be measured, and/or may instruct various other actions such as maintenance, repair, and/or deprecation of the component and/or system. Moreover, the vibration analysis subsystem 914 may also perform various other processes or functions associated with analysis of data from the example optical vibration measurement systems, as further described herein.

The network interface 916 may be configured to allow data to be exchanged between the aerial vehicle control system 430, other devices attached to a network, such as other computer systems, aerial vehicle control systems of other aerial vehicles, and/or other example optical vibration measurement systems. For example, the network interface 916 may enable wireless communication between numerous aerial vehicles. In various implementations, the network interface 916 may support communication via wireless general data networks, such as a Wi-Fi network. For example, the network interface 916 may support communication via telecommunications networks such as cellular communication networks, satellite networks, and the like.

Input/output devices 918 may, in some implementations, include one or more displays, light sources, lasers, splitters, image capture devices, thermal sensors, infrared sensors, ultraviolet (UV) sensors, photodetectors, photosensors, time of flight sensors, accelerometers, pressure sensors, weather sensors, etc. Multiple input/output devices 918 may be present and controlled by the aerial vehicle control system 430. One or more of these sensors may be utilized to assist in the optical vibration measurement processes as well as further operations described herein.

As shown in FIG. 9, the memory may include program instructions 922 which may be configured to implement the example processes and/or sub-processes described above. The data storage 924 and/or other data items 926 may include various data stores for maintaining data items that may be provided for the various processes, methods, functions, and operations described herein associated with the example optical vibration measurement systems.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the aerial vehicle control system 430 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The aerial vehicle control system 430 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 430. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle control system 430 may be transmitted to the aerial vehicle control system 430 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other aerial vehicle control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An unmanned aerial vehicle, comprising:
   a fuselage;
   a wing coupled to the fuselage;
   a motor arm extending from the fuselage;
   a motor coupled to the motor arm, the motor configured to rotate a propeller;
   an optical vibration measurement subsystem, comprising:
      a laser source;
      a photovoltaic sensor coupled to the laser source;
      a first fiber optic cable connected between the laser source and at least one of the fuselage, the wing, the motor arm, or the motor;
      a reflector associated with a surface of the at least one of the fuselage, the wing, the motor arm, or the motor; and
      a second fiber optic cable connected between the at least one of the fuselage, the wing, the motor arm, or the motor and the photovoltaic sensor; and
   a controller configured to at least:

cause the laser source to emit light that is directed along the first fiber optic cable toward the reflector, wherein the light is reflected by the reflector along the second fiber optic cable toward the photovoltaic sensor;

detect an operating position of the reflected light received by the photovoltaic sensor, wherein the operating position is a position upon a surface of the photovoltaic sensor at which the reflected light is detected;

determine a difference between the operating position of the reflected light and a nominal position of the reflected light upon the surface of the photovoltaic sensor; and alter operation of at least one component of the unmanned aerial vehicle based at least in part on the difference.

2. The unmanned aerial vehicle of claim 1, wherein the fuselage comprises at least one of the controller, a power supply, an avionic component, or a sensor; and wherein the reflector is associated with a surface of the at least one of the controller, the power supply, the avionic component, or the sensor.

3. The unmanned aerial vehicle of claim 1, wherein the photovoltaic sensor comprises a complementary metal oxide semiconductor (CMOS) imaging sensor, and wherein the reflector comprises a mirror.

4. The unmanned aerial vehicle of claim 1, wherein altering the operation of at least one component of the unmanned aerial vehicle based at least in part on the difference comprises altering the operation of the motor configured to rotate the propeller.

5. An optical vibration measurement system, comprising:
a light source;
an optical sensor positioned proximate to the light source;
a reflector associated with a component to be measured;
a first fiber optic cable connected between the light source and the reflector; and
a controller configured to at least:
during operation of a system associated with the component to be measured,
cause the light source to emit light toward the reflector via the first fiber optic cable, wherein the light is reflected by the reflector toward the optical sensor;
detect an operating position of the reflected light received by the optical sensor, wherein the operating position is a position upon a surface of the optical sensor at which the reflected light is detected;
determine a difference between the operating position of the reflected light and a nominal position of the reflected light; and
alter the operation of the system associated with the component to be measured based at least in part on the difference.

6. The optical vibration measurement system of claim 5, further comprising:
a second fiber optic cable connected between the reflector and the optical sensor;
wherein the optical sensor is configured to receive light reflected from the reflector via the second fiber optic cable.

7. The optical vibration measurement system of claim 5, wherein the light source is configured to emit at least one of infrared light or visible light.

8. The optical vibration measurement system of claim 5, wherein the light source is configured to emit at least one of continuous light or pulses of light.

9. The optical vibration measurement system of claim 5, further comprising:
a plurality of first fiber optic cables connected between the light source and a plurality of reflectors associated with a respective plurality of components to be measured; and
a splitter configured to direct at least one of respective pulses or respective wavelengths of light from the light source to respective ones of the plurality of reflectors via the plurality of first fiber optic cables.

10. The optical vibration measurement system of claim 9, further comprising:
a plurality of second fiber optic cables connected between the plurality of reflectors associated with the respective plurality of components to be measured and the optical sensor.

11. The optical vibration measurement system of claim 5, wherein the light source comprises a first light source, the optical sensor comprises a second optical sensor positioned proximate to the first light source, and the reflector comprises a first reflector associated with a first component to be measured; and
the system further comprising:
a second light source;
a first optical sensor positioned proximate to the second light source; and
a second reflector associated with a second component to be measured;
wherein the first light source is configured to emit first light toward the first reflector, and the first optical sensor is configured to receive the first light reflected from the first reflector; and
wherein the second light source is configured to emit second light toward the second reflector, and the second optical sensor is configured to receive the second light reflected from the second reflector.

12. The optical vibration measurement system of claim 5, wherein the controller is further configured to at least:
during non-operation of the system associated with the component to be measured,
cause the light source to emit light toward the reflector via the first fiber optic cable, wherein the light is reflected by the reflector toward the optical sensor; and
detect the nominal position of the reflected light received by the optical sensor, wherein the nominal position is another position upon the surface of the optical sensor.

13. The optical vibration measurement system of claim 5, wherein a system associated with the component to be measured comprises an unmanned aerial vehicle; and
wherein the component to be measured comprises at least one of a structural component, an electromechanical component, an avionics component, or a sensor associated with the unmanned aerial vehicle.

14. The optical vibration measurement system of claim 13, wherein the light source and the optical sensor are coupled to at least one of a frame or a fuselage of the unmanned aerial vehicle.

15. A method to optically measure vibration, comprising:
initiating operation of a system comprising a component to be measured;
causing a light source to emit light toward a reflector associated with the component via a first fiber optic cable, wherein the light is reflected by the reflector toward an optical sensor positioned proximate to the light source;

detecting an operating position of the reflected light received by the optical sensor, wherein the operating position is a position upon a surface of the optical sensor at which the reflected light is detected;

determining a difference between the operating position of the reflected light and a nominal position of the reflected light; and altering the operation of the system associated with the component to be measured based at least in part on the difference.

16. The method of claim 15, further comprising:

during non-operation of the system comprising the component to be measured,
  causing the light source to emit light toward the reflector, wherein the light is reflected by the reflector toward the optical sensor; and
  detecting the nominal position of the reflected light received by the optical sensor, wherein the nominal position is another position upon the surface of the optical sensor.

17. The method of claim 15, wherein the reflected light is transmitted from the reflector toward the optical sensor via a second fiber optic cable.

18. The method of claim 15, wherein the system comprises a plurality of components to be measured, and further comprising:

directing, via a splitter, at least one of respective pulses or respective wavelengths of light from the light source to a respective plurality of reflectors associated with respective ones of the plurality of components, wherein the at least one of the respective pulses or the respective wavelengths of light are reflected by the respective plurality of reflectors to the optical sensor.

19. The method of claim 15, wherein the system comprises a plurality of components to be measured; and wherein causing a light source to emit light toward a reflector associated with the component via the first fiber optic cable, wherein the light is reflected by the reflector toward an optical sensor positioned proximate to the light source comprises:
  causing a first light source to emit first light toward a first reflector associated with a first component via the first fiber optic cable, wherein the first light is reflected by the first reflector toward a first optical sensor positioned proximate to a second light source; and the method further comprising:

causing the second light source to emit second light toward a second reflector associated with a second component via a third fiber optic cable, wherein the second light is reflected by the second reflector toward a second optical sensor positioned proximate to the first light source.

\* \* \* \* \*

UNITED STATES PATENT AND TRADEMARK OFFICE
CERTIFICATE OF CORRECTION

PATENT NO. : 11,385,097 B1  
APPLICATION NO. : 15/995001  
DATED : July 12, 2022  
INVENTOR(S) : Noah Allstot et al.

Page 1 of 1

It is certified that error appears in the above-identified patent and that said Letters Patent is hereby corrected as shown below:

On the Title Page

Item (72):
"Bradley Leonard, Yucaipa, CA (US);" should read as --Bradley Leonard, Dover, VT (US);--.

Signed and Sealed this  
Thirteenth Day of September, 2022

Katherine Kelly Vidal  
*Director of the United States Patent and Trademark Office*